(12) United States Patent
Iwata et al.

(10) Patent No.: US 9,114,519 B2
(45) Date of Patent: Aug. 25, 2015

(54) ELECTRIC ROTATING TOOL

(75) Inventors: Kazutaka Iwata, Hitachinaka (JP);
Kenichirou Yoshida, Hitachinaka (JP);
Shinji Watanabe, Hitachinaka (JP)

(73) Assignee: HITACHI KOKI CO., LTD., Tokyo (JP)

( * ) Notice: Subject to any disclaimer, the term of this patent is extended or adjusted under 35 U.S.C. 154(b) by 356 days.

(21) Appl. No.: 12/867,239

(22) PCT Filed: Feb. 16, 2009

(86) PCT No.: PCT/JP2009/053102
§ 371 (c)(1),
(2), (4) Date: Aug. 11, 2010

(87) PCT Pub. No.: WO2009/102082
PCT Pub. Date: Aug. 20, 2009

(65) Prior Publication Data
US 2010/0307782 A1 Dec. 9, 2010

(30) Foreign Application Priority Data
Feb. 14, 2008 (JP) .................................. 2008-032944

(51) Int. Cl.
*B25F 5/00* (2006.01)
*H02P 29/02* (2006.01)
*H02H 7/085* (2006.01)

(52) U.S. Cl.
CPC ................ *B25F 5/00* (2013.01); *H02P 29/021* (2013.01); *H02H 7/0854* (2013.01)

(58) Field of Classification Search
CPC .................................. E21B 15/04; H02P 6/08
USPC ..................... 173/1, 2, 20, 176, 181; 318/430; 700/168, 170
See application file for complete search history.

(56) References Cited

U.S. PATENT DOCUMENTS

| | | | | |
|---|---|---|---|---|
| 4,249,117 A | * | 2/1981 | Leukhardt et al. | 318/275 |
| 4,604,006 A | * | 8/1986 | Shoji et al. | 408/76 |
| 5,361,022 A | * | 11/1994 | Brown | 318/375 |
| 5,602,708 A | * | 2/1997 | Felgenhauer | 361/51 |
| 5,619,109 A | * | 4/1997 | Cameron et al. | 318/375 |
| 5,914,882 A | * | 6/1999 | Yeghiazarians | 700/177 |
| 5,936,364 A | * | 8/1999 | Ohsawa et al. | 318/432 |
| 6,236,177 B1 | * | 5/2001 | Zick et al. | 318/362 |
| 6,479,958 B1 | * | 11/2002 | Thompson et al. | 318/430 |
| 7,395,871 B2 | * | 7/2008 | Carrier et al. | 173/1 |
| 2006/0018386 A1 | * | 1/2006 | Bjontegaard | 375/240.25 |
| 2006/0081386 A1 | * | 4/2006 | Zhang et al. | 173/2 |
| 2006/0222930 A1 | * | 10/2006 | Aradachi et al. | 429/96 |
| 2008/0018295 A1 | * | 1/2008 | Jami | 318/799 |

FOREIGN PATENT DOCUMENTS

| | | |
|---|---|---|
| JP | 06-219289 A | 8/1994 |
| JP | 10-234130 A | 9/1998 |
| JP | 2004-66413 A | 4/2004 |
| JP | 2005-14140 A | 1/2005 |
| JP | 2006-26850 A | 2/2006 |
| WO | WO 2007/098227 A2 | 8/2007 |

* cited by examiner

*Primary Examiner* — Nathaniel Chukwurah
(74) *Attorney, Agent, or Firm* — Kilpatrick Townsend & Stockton LLP

(57) ABSTRACT

A current detection circuit (18) detects that a drive current of the stator coil (2d) is exceeding a threshold value Ir. A rotation number detection circuit (17) detects that the number of rotations of a rotor (2a) is lower than a threshold value Nr. A computing part (20) outputs a PWM signal which switches a semiconductor switching element (3a) of the inverter circuit part (3). The computing part (20) changes the threshold values Ir and Nr in accordance with the PWM duty of the PWM signal determined in accordance with a pressed distance of a switch trigger (7) and detects a locked state of the motor (2) on the conditions that the motor current I is exceeding the set threshold value Ir and that the number of rotations N thereof is lower than the threshold value Nr.

19 Claims, 17 Drawing Sheets

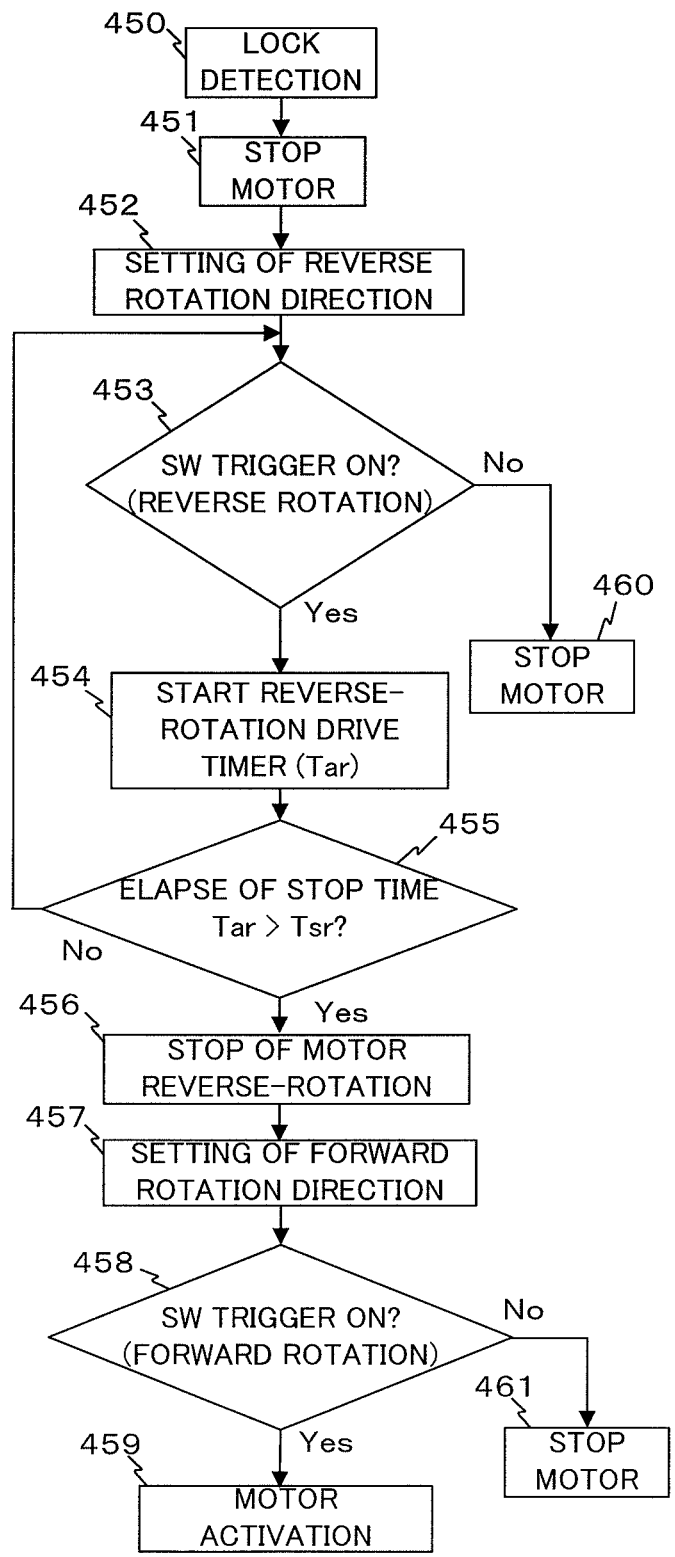

ELECTRIC ROTATING TOOL

CROSS-REFERENCE TO RELATED APPLICATIONS

This application is a National Stage of International Application No. PCT/JP2009/053102 filed Feb. 16, 2009, and which claims the benefit of Japanese Patent Application No. 2008-032944, filed Feb. 14, 2008, the disclosures of which are incorporated herein by reference.

TECHNICAL FIELD

The present invention relates to an electric rotating tool, a control method, and a program and, in particular, to an electric rotating tool, a control method, and a program having a lock detection function of detecting a locked state of a motor, for example, a brushless DC motor, that is used as a drive source.

BACKGROUND ART

Conventionally, in a tightening operation of a fastener such as a bolt, nut, or screw, an electric rotating tool such as an impact driver or a driver drill is used. In the impact driver, an electric motor is provided, and a power transmission shaft which decelerates and, at the same time, transmits the rotating force of the electric motor is provided. Furthermore, an impact mechanism including a hammer is provided on the power transmission shaft. The power transmission shaft is coupled with an anvil via the impact mechanism. When an operation that the hammer and the anvil are engaged with each other in a striking manner is repeated, intermittent rotary striking force is transmitted to a tip tool such as a driver bit held by the anvil. In the case in which a tightening operation of a screw or the like is to be carried out by using such an impact driver, when strong load torque is applied to the driver bit, the coupling between the power transmission shaft and the anvil and the driver bit is temporarily interrupted by the function of a clutch mechanism which is operated by the fastening torque that is set in advance, and the electric motor idles.

The driver drill has two operation modes which are a driver mode for carrying out a tightening operation of a fastener and a drill mode for carrying out a cutting operation of a metal plate, etc. When a fastening operation of a fastener is to be carried out by using the driver drill, the operation mode of the driver drill is set to the driver mode. In the driver mode, a clutch mechanism including a torque adjustment mechanism is disposed between a rotating shaft of the electric motor and a spindle. When the load of the driver attached to the spindle becomes larger than the rotary torque, the rotation transmission from the electric motor to the spindle is interrupted by the clutch function.

Meanwhile, when a cutting operation of carrying out boring of metal or the like is to be carried out by using the driver drill as an electric rotating tool, the operation mode of the driver drill is set to the drill mode. In the drill mode, the rotating shaft of the electric motor is connected to the anvil or the spindle without the interposition of the clutch mechanism. In this manner, in the driver drill, generally, the operation mode is switched to the driver mode (clutch mode) when the tightening operation of a fastener is to be carried out, and the operation mode is switched to the drill mode when the cutting operation of a metal plate or the like is to be carried out.

SUMMARY OF INVENTION

However, in the driver drill used in the drill mode, when the load in the cutting operation becomes equal to or larger than allowable torque of the electric motor, the electric motor is caused to be in a locked state, large current flows therein, and the temperature of the electric motor is rapidly increased. In this case, in order to once cool the electric motor, the electric motor has to be stopped, and the fastening operation or the cutting operation has to be temporarily stopped. As a result, the operating efficiency is lowered. In addition, the rapid temperature increase due to the lock of the electric motor causes burnout of an insulating layer of the electric motor or thermal damage of semiconductor switching elements of a drive circuit of the electric motor.

It is an object of the present invention to provide an electric rotating tool, control method, and program which are accomplished in view of the above described circumstances and capable of appropriately detecting the locked state of the electric motor.

It is another object of the present invention to provide an electric rotating tool, control method, and program having a lock detection means suitable for a cordless-type electric rotating tool using a brushless DC motor.

It is further another object of the present invention to provide an electric rotating tool, control method, and program which enable drive within the range that does not cause the burnout after the electric motor is caused to be in the locked state.

It is further another object of the present invention to provide an electric rotating tool, control method, and program which improve the operating efficiency per one time of charge of a battery pack in a cordless-type electric rotating tool using the charge-type battery pack.

Typical characteristics of the invention disclosed in the present application in order to achieve the above described objects will be explained below.

An electric rotating tool according to a first aspect of the present invention has:

an operating part;

a power source part;

a motor having a rotor and a stator coil;

an inverter circuit part which has a semiconductor switching element inserted between the power source part and the stator coil;

a current detection part which detects a drive current, which flows through the stator coil, and outputs a signal corresponding to a result of the detection;

a rotation number detection part which detects the number of rotations of the rotor and outputs a signal corresponding to a result of the detection;

a control part which generates and outputs a PWM signal for driving the semiconductor switching element of the inverter circuit part based on an operated degree of the operating part, the detection signal of the current detection part, and the detection signal of the rotation number detection part; and a lock state detection part which detects a locked state of the motor on the conditions that the value of the drive current detected by the current detection part exceeds a' first threshold value and that the number of rotations detected by the rotation number detection part is lower than a second threshold value.

According to another characteristic of the present invention, the lock state detection part changes the first threshold value and the second threshold value in accordance with a PWM duty of the PWM signal.

According to further another characteristic of the present invention, a motor stopping part which causes the control part to drive the motor during drivable time having length corresponding to the first threshold value from the point when the motor is detected to be in the locked state by the lock state detection part and, after elapse of the time, causes the control part to stop driving the motor.

According to further another characteristic of the present invention, a temperature measurement part which measures the temperature of the motor or the inverter circuit part; wherein the motor stopping part changes the length of the drivable time in accordance with the first threshold value and the temperature which is measured by the temperature measurement part before lock state detection of the motor.

According to further another characteristic of the present invention, the motor stopping part sets the length of the drivable time based on estimated time taken until the temperature measured by the temperature measurement circuit part is increased to a burnout temperature after the locked state is detected.

According to further another characteristic of the present invention, the control part comprises a current restricting part which restricts the drive current to a predetermined current restrictive value, which is smaller than the first threshold value, within the drivable time when the drive current at the point when the locked state of the motor is detected has a current value larger than the first threshold value.

According to further another characteristic of the present invention, the current restricting part restricts the PWM duty of the PWM signal to be small so as to restrict the drive current from the first threshold value to the current restrictive value.

According to further another characteristic of the present invention, the control part further comprises a rotation direction setting part which sets the rotation direction of the motor; wherein when the locked state of the motor is detected, drive of the motor is stopped, the rotation direction set by the rotation direction setting part is set to a reverse rotation direction, the motor is then rotated for predetermined time in the reverse rotation direction, and the motor is then stopped.

According to further another characteristic of the present invention, the control part stops drive of the motor in the reverse rotation direction, then sets the rotation direction of the motor to the forward rotation direction again, and controls motor so that the motor can be activated in the forward rotation direction.

According to further another characteristic of the present invention, the control part changes the PWM duty of the PWM signal in accordance with the operated degree of the operating part.

According to further another characteristic of the present invention, an indicating part which is lit when the lock state detection part detects that the motor is in the locked state.

According to further another characteristic of the present invention, the electric rotating tool is a driver drill, a drill, an impact driver, a driver, or a disk grinder.

According to further another characteristic of the present invention, the battery pack has a secondary battery.

According to further another characteristic of the present invention, the battery pack has a lithium ion secondary battery.

According to further another characteristic of the present invention, the motor is a brushless DC motor.

A control method according to a second aspect of the present invention is a control method of an electric rotating tool comprising an operating part; a power source part; a motor having a rotor and a stator coil; and an inverter circuit part which has a semiconductor switching element inserted between the power source part and the stator coil; the control method characterized by including:

a first step of detecting the drive current which flows through the stator coil;

a second step of detecting the number of rotations of the rotor; and a third step of detecting the locked state of the motor on the conditions that the value of the detected drive current exceeds a first threshold value and that the detected number of rotations is lower than a second threshold value.

A program according to a third aspect of the present invention is a program executed by a computer which controls an electric rotating tool comprising an operating part; a power source part; a motor having a rotor and a stator coil; and an inverter circuit part which has a semiconductor switching element inserted between the power source part and the stator coil; the program causes the computer to execute a first procedure of detecting the drive current which flows through the stator coil;

a second procedure of detecting the number of rotations of the rotor; and a third procedure of detecting the locked state of the motor on the conditions that the value of the detected drive current exceeds a first threshold value and that the detected number of rotations is lower than a second threshold value.

According to a characteristic of the above described present invention, the first threshold value (Ir) and the second threshold value (Nr) are set in accordance with the magnitude of the PWM duty of the PWM signal; therefore, even in an operation in which the PWM duty is small and rotation torque is small, the locked state of the motor can be accurately and appropriately detected in accordance with load torque. In other words, the locked state can be appropriately detected in accordance with the magnitude of the load of the motor. As a result, burnout of the motor and the inverter circuit part (motor drive circuit part) can be prevented. In addition, since detection of the locked state in accordance with the load state can be carried out, the operating efficiency per one time of charge of the battery pack can be improved.

According to another characteristic of the above described present invention, the motor can be driven within the allowable range in which it is not burnt out during the allowable time (Tstop) after the locked state is started; therefore, accurate and appropriate lock detection and overcurrent protection can be achieved without being affected by the influence of switching noise of the semiconductor switching elements of the inverter circuit part 3 and noise (spike voltage) of the motor.

In addition, within the range in which the motor or the inverter circuit part is not burnt out, drive of the motor is continued. Consequently, as long as there is no possibility of occurrence of burnout of the motor or the inverter circuit part, without interrupting a drilling operation, etc. the operation can be continued. As a result, the operating efficiency per one time of charge can be further improved.

According to further another characteristic of the present invention, after lock detection, the rotation direction of the motor is controlled to be reversely rotated for predetermined time; therefore, lock cancellation can be automatically carried out.

Further other objects of the present invention and further other novel characteristics of the present invention will be further elucidated by below descriptions of the present specification and appended drawings.

BRIEF DESCRIPTION OF DRAWINGS

FIG. 17 is a control flow chart according to a fifth embodiment of the lock detection means and the motor stopping means in the driver drill of FIG. 2.

BEST MODES FOR CARRYING OUT THE INVENTION

First Embodiment

Figure 1:
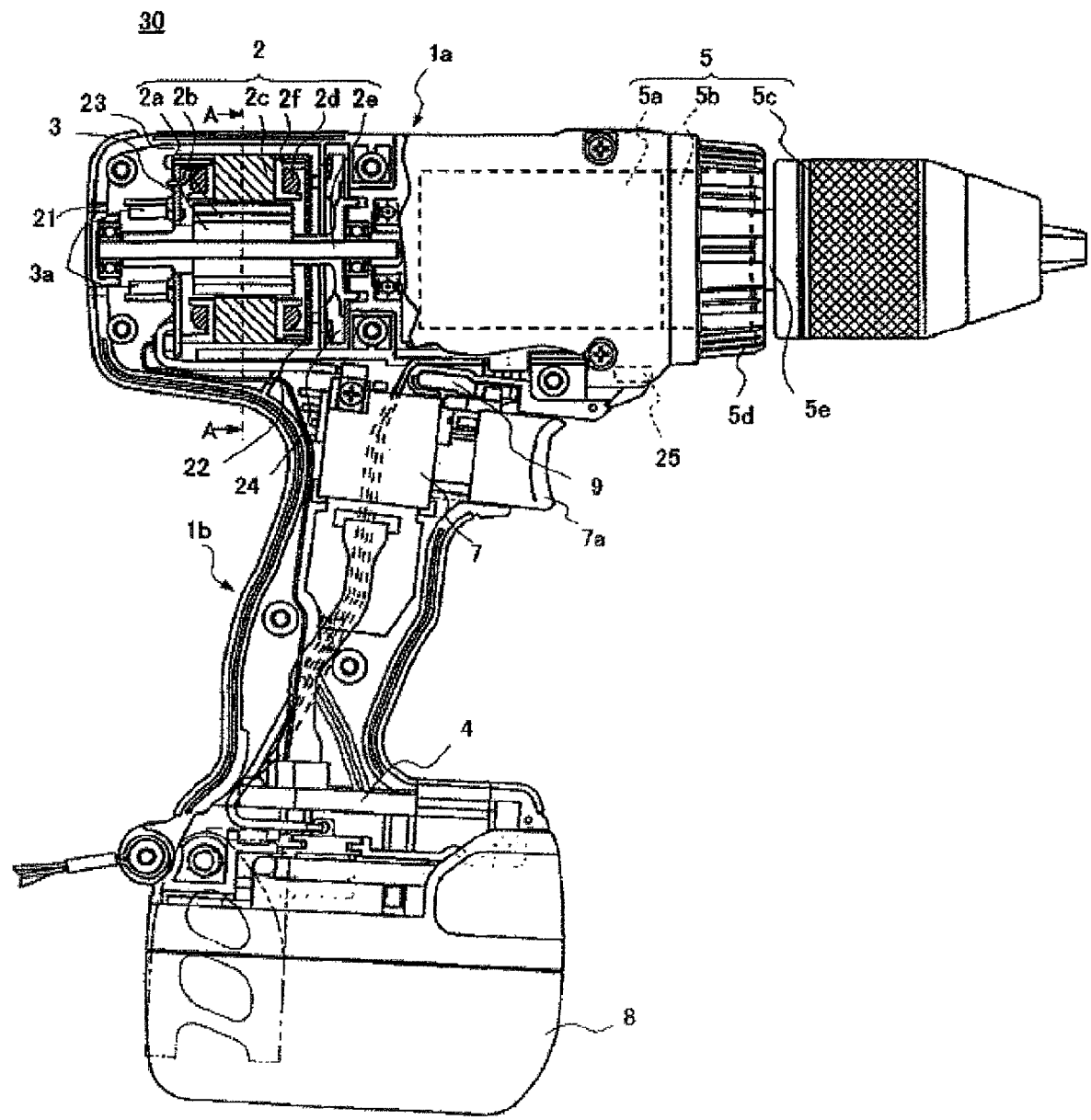
FIG. 1 is an overall structure drawing of a driver drill according to an embodiment of the present invention.

Hereinafter, an embodiment of the present invention will be explained in detail based on drawings. Note that, in all the drawings for explaining present embodiments, the members having the same functions are denoted by the same reference numerals, and repetitive explanations will be omitted.

Figure 2:
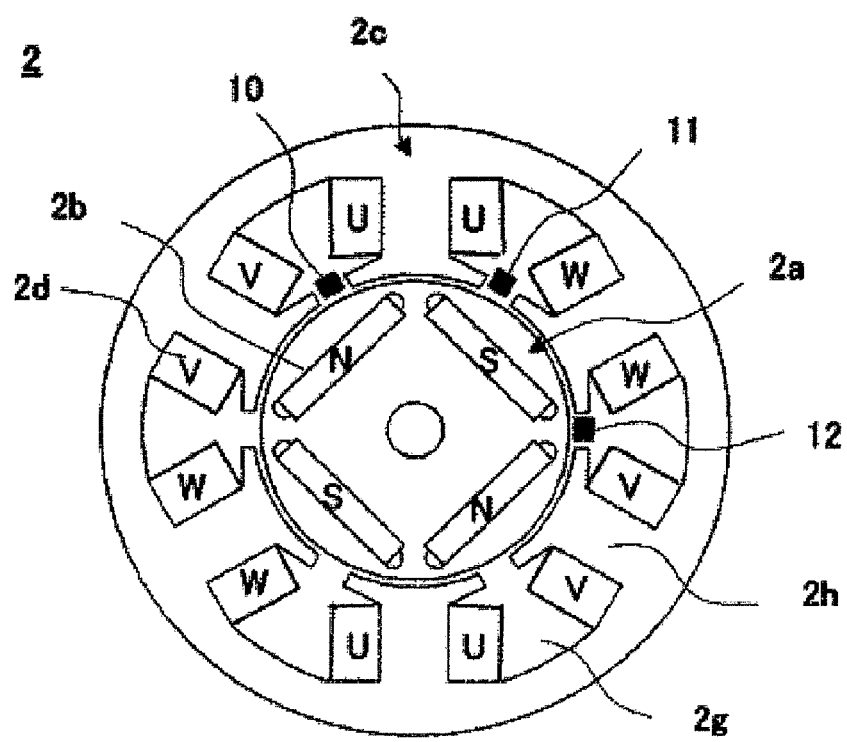
FIG. 2 is a cross sectional drawing of the driver drill along a line A-A of the driver drill of FIG. 1.
Figure 3:
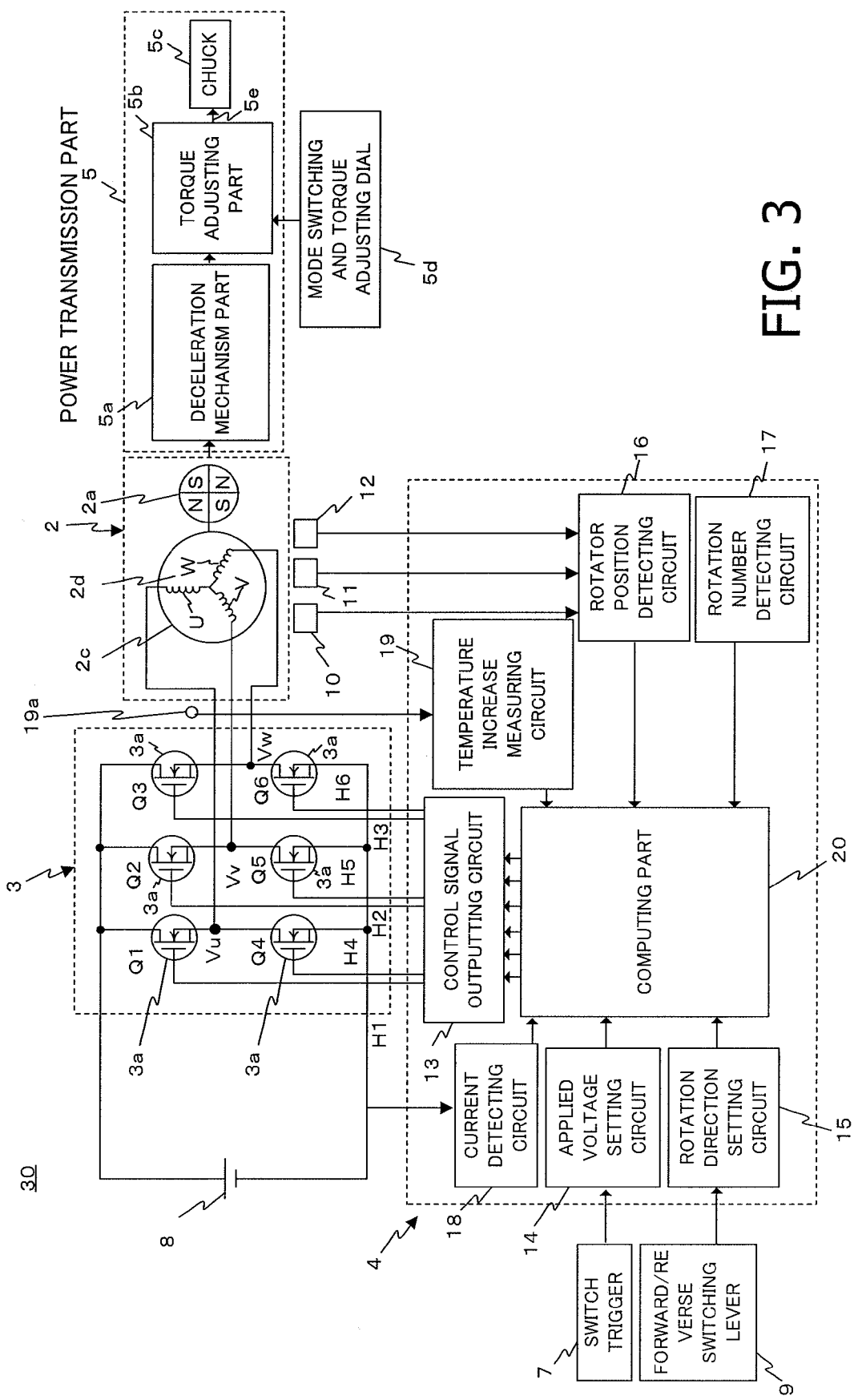
FIG. 3 is a functional block diagram of the driver drill of FIG. 1.

FIG. 1 is an overall structure drawing of a cordless-type driver drill according to an embodiment of the present invention. FIG. 2 is a partial cross-sectional drawing of the driver drill (brushless DC motor) along a line A-A shown in FIG. 1. Furthermore, FIG. 3 is a functional block diagram showing the entirety of the driver drill shown in FIG. 1.

[Assembly Configuration of Electric Rotating Tool]

As shown in FIG. 1, a motor 2 is housed in a body housing part 1a of the driver drill 30. A tip tool such as a driver or a drill (not shown) is connected to the motor 2 via a power transmission part 5. The power transmission part 5 transmits the driving force of the motor 2 to the tip tool such as the driver or the drill (not shown). The motor 2 is driven by an inverter circuit part (circuit board) 3. The inverter circuit part 3 is housed in a left-side end part (left side of the motor 2) in the body housing part 1a.

The power transmission part 5 will be explained in further detail. The power transmission part 5 has a deceleration mechanism part 5a, a torque adjusting part 5b, a chuck 5c, a mode switching and torque adjusting dial (hereinafter, abbreviated as "switching/adjusting dial") 5d, and a spindle (output shaft) 5e. A rotation output shaft 2e of the motor 2 is connected to the deceleration mechanism part 5a. The deceleration mechanism part 5a transmits the rotating force of the motor 2 in the direction of the rotation output shaft 2e and reduces the number of rotations thereof. The deceleration mechanism part 5a is housed in an intermediate part of the body housing part 1a.

The torque adjusting part 5b is connected to the deceleration mechanism part 5a. The torque adjusting part 5b adjusts whether to transmit the rotary torque, which is generated at an output shaft of the deceleration mechanism part 5a, to the spindle 5e or not in accordance with load of the spindle 5e. The torque adjusting part 5b is housed in a right-end side of the body housing part 1a.

The spindle 5e is an output shaft connected to the torque adjusting part 5b. The chuck 5c is connected to the spindle 5e. A tip tool is detachably held by the chuck 5c. The rotation of the motor 2 generated by drive by the inverter circuit part 3 applies rotating force to the tip tool via the deceleration mechanism part 5a, the torque adjusting part 5b, the spindle 5e, and the chuck 5c.

The switching/adjusting dial 5d is attached to the torque adjusting part 5b. The switching/adjusting dial 5d has a mode switching dial and a torque adjusting dial (clutch dial). The mode switching dial is a dial for switching the operation mode of the driver drill 30. The operation mode of the driver drill 30 can be set either to the driver mode or the drill mode by switching the mode switching dial. The torque adjusting dial is a dial for adjusting tightening torque. When the mode switching dial is set to the driver mode and the torque adjusting dial is rotated by a predetermined rotation angle of a plurality of levels, the torque adjusting part 5b adjusts the rotary torque, which is transmitted from the output shaft of the deceleration mechanism part 5a to the spindle 5e, to the tightening torque corresponding to the rotation angle of the torque adjusting dial.

For example, ten levels of tightening torque can be set by the torque adjusting dial. If load torque that is equal to or more than the set tightening torque (sliding torque) is applied to the spindle 5e, the output shaft of the deceleration mechanism part 5a is disconnected from coupling with the spindle 5e by the clutch mechanism of the torque adjusting part 5b and idles. Consequently, the tip tool held by the spindle 5e is not locked, and the motor 2 is not caused to be in the locked state. As a result, burnout of the motor 2 and the inverter circuit part 3 caused by a lock current can be prevented.

On the other hand, in the switching/adjusting dial 5*d*, when the mode switching dial is set to the drill mode, the rotation angle of the torque adjusting dial is automatically set to be maximum, and the deceleration mechanism part 5*a* is connected to the spindle 5*e* without the interposition of the clutch mechanism. In this case, when the load applied from a processing target becomes larger than the torque of the spindle 5*e* in the drill mode, the tip tool held by the spindle 5*e* is locked, and the motor 2 is caused to be in the locked state since the spindle 5*e* is not connected via the clutch mechanism.

Due to the locked state, undesired excessive drive current flows to the motor 2 and the inverter circuit part 3. The excessive drive current causes burnout of the motor 2 and later-described semiconductor switching elements 3*a* in the inverter circuit part 3. In order to prevent the burnout of the semiconductor switching elements 3*a*, a lock detection means, which will be described later, is provided in the driver drill 30.

The deceleration mechanism part 5*a* has, for example, a two-stage planetary gear deceleration mechanism (speed change gear case) (not shown) which is meshed with a pinion gear of the rotation output shaft 2*e* of the motor 2.

The torque adjusting part 5*b* adjusts, for example, the pressing force of the spindle 5*e* against the rotating output shaft (not shown) of the deceleration mechanism part 5*a* by biasing force of a coiled spring (not shown). The tightening torque (load torque) can be adjusted by adjusting the biasing force of the coiled spring. If the fastening torque toward the spindle 5*e* exceeds the biasing force caused by the coiled spring toward the deceleration mechanism part 5*a*, the rotation transmission to the spindle 5*e* is disconnected by the above described clutch function, and the rotation output shaft of the deceleration mechanism part 5*a* idles. As described above, the load torque (tightening torque) of the above described clutch function is adjusted by rotating the clutch dial of the switching/adjusting dial 5*d* by the predetermined rotation angle of the plurality of levels in the driver mode and adjusting the biasing force of the above described coiled spring.

The motor 2 and the inverter circuit part 3 constitute a three-phase brushless DC motor. As shown in FIG. 2, the motor 2 has a stator 2*c*, a rotor (magnet rotor) 2*a*, and a stator coil (armature coil) 2*d*. The stator 2*c* has a cylindrical outer shape, thereby forming a stator yoke. On an inner peripheral side surface of the stator 2*c*, teeth portions 2*h* are provided.

The rotor 2*a* is concentrically provided in an inner peripheral part of the teeth portions 2*h* of the stator 2*c*. The rotor 2*a* is a rotator of an inner magnet layout type in which north-pole and south-pole permanent magnets (magnets) extending in the direction of the rotation output shaft 2*e* are embedded.

The stator coil 2*d* is three-phase coils U, V, and W. Hereinafter, the stator coil 2*d* is also referred to as stator coils 2*d* (U, V, W). The stator coils 2*d* (U, V, W) are wound in slots 2*g* via an insulting layer (not shown) comprising a resin material so as to surround the teeth portions 2*h* of the stator 2*c*. The stator coils 2*d* (U, V, W) are in star connection.

In the vicinities of the rotor 2*a*, in order to detect the rotation position of the rotor 2*a*, three rotation position detecting elements 10, 11, and 12 (see FIG. 3) are disposed in every 60° of the rotation direction. Position detection signals of the rotation position detecting elements 10, 11, and 12 are output to a control circuit part 4. The control circuit part 4 controls the inverter circuit 3 based on the input position detection signals. As a result of this control, a current that is controlled to a power-distribution range of an electric angle of 120° is supplied to the stator coils 2*d* (U, V, W).

Note that elements which carry out detection by hall ICs in an electromagnetically-coupling manner are employed as the rotation position detecting elements 10, 11, and 12. However, as the rotation position detecting elements 10, 11, and 12, it is also possible to employ sensorless-type elements which detect the rotor position by extracting the induced voltages (back electromotive force) of the stator coils 2*d* (U, V, W) as logic signals through a filter.

As shown in FIG. 1, the body housing part 1*a* comprises a synthetic resin material and is integrally formed with a handle housing part 1*b*. The body housing part 1*a* and the handle housing part 1*b* are divided into two by a vertical plane (the cross section of the partial cross sectional drawing of FIG. 1) along the rotation axis of the motor 2. In other words, a pair of parts each of which having a semicircular cross sectional shape is prepared as the integrally formed body housing part 1*a* and handle housing part 1*b*. After housed objects such as the rotor rotation shaft 2*e* and the stator 2*c* of the motor 2 are incorporated in the body housing part 1*a* and the handle housing part 1*b* of one side, the body housing part 1*a* and the handle housing part 1*b* of the other side are superimposed thereon, and both of them are joined by screw fastening, etc; thus, assembling of the driver drill is completed.

In the joined body (completed body) of the pair of the body housing part 1*a* and the handle housing part 1*b*, the outer peripheral surface of the stator 2*c* is held or sandwiched by a plurality of stator holding portions (rib portions) which are integrally formed with the body housing part 1*a*.

A cooling fan 24 is provided in a right-end side of the motor 2. Although it is not illustrated, an air-discharge opening (ventilation opening) is formed on the body housing part 1*a* in the vicinity of the cooling fan 24. Meanwhile, an air-intake opening (ventilation opening) 21 is formed at a left end of the body housing part 1*a*. A path 23 which is formed from the air-intake opening 21 to the air-discharge opening formed in the vicinity of the cooling fan 24 is a flow path of cooling air. The path 23 suppresses the temperature increase of the semiconductor switching elements 3*a* in the inverter circuit part 3 and the temperature increase of the stator coils 2*d* in the motor 2. Particularly, in the driver mode or the drill mode, a large current flows to the semiconductor switching elements 3*a* depending on the load state of the motor 2, and the heating value of the semiconductor switching elements 3*a* becomes large; therefore, the inverter circuit part 3 has to be forcibly cooled by air by the cooling fan 24.

Note that the inverter circuit part 3 comprises a circular circuit board and thoroughly covers one end side of the stator 2*c* of the motor 2. Meanwhile, a dust preventing cover 22 is provided in the other end side of the stator 2*c*. As well as the inverter circuit part 3, the dust preventing cover 22 covers the other end-side surface of the stator 2*c*. Both the inverter circuit part 3 and the dust preventing cover 22 have dust-preventing structures (sealing structures) that close or seal the rotor 2*a* together with the stator 2*c*. Thus, incoming of dust into the motor 2 can be prevented.

A battery pack 8 which serves as a drive power source of the motor 2 is detachably attached to a lower end part of the handle housing part 1*b*. To an upper part of the battery pack 8, the control circuit part (circuit board) 4 for controlling the inverter circuit part 3 is provided to extend in the transverse direction of the page.

A switch trigger 7 is disposed in an upper end part of the handle housing part 1*b*. A trigger operating part 7*a* of the switch trigger 7 is projecting from the handle housing part 1*b* in the state that it is biased by spring force. When an operator grips the trigger operating part 7a in an inward direction of the handle housing part 1b against the spring force, the trigger pressed distance (operating degree) is adjusted. The number of rotations of the motor 2 is controlled by the trigger pressed distance. According to the present embodiment, the pulse-width modulation duty (PWM duty) of a PWM signal which drives the semiconductor switching elements 3a of the inverter circuit part 3 is varied in accordance with the trigger pressed distance; therefore, the switch trigger 7 and an applied voltage setting circuit 14 (see FIG. 3), which will be described later, are electrically connected to each other.

In order to supply drive power to the switch trigger 7, the control circuit part 4, and the inverter circuit part 3, the battery pack 8 is electrically connected therewith. A secondary battery is used as a battery of the battery pack 8. For example, a lithium-ion battery is used as the secondary battery. The power supply voltage of the lithium-ion battery is set to, for example, 14.4 V. The lithium-ion battery has advantages that the battery has an energy density about three times higher compared with a nickel cadmium battery or a nickel hydride battery and that the battery is small and has a light weight. By virtue of these advantages, the part required for housing the battery pack 8 in the handle housing part 1b can be downsized. As a result, the need to house the battery pack 8 in a gripping part of the handle housing part 1b is eliminated; therefore, the length of the outer periphery of the gripping part can be formed to be shorter compared with the cases in which other battery types are used. As a result, the shape of the gripping part can be caused to be a handle shape that can be easily gripped.

[Circuit Configuration of Electric Rotating Tool]

The circuit configuration of the motor 2, the inverter circuit part 3, and the control circuit part 4 will be explained with reference to FIG. 3.

The inverter circuit part (power inverter) 3 has six semiconductor switching elements 3a which are connected in the three-phase bridge method. As the semiconductor switching elements 3a, insulated-gate bipolar transistors (IGBT) can be used. These six semiconductor switching elements 3a are also referred to as transistors Q1 to Q6.

The combination of the transistors Q1 and Q4, the combination of the transistors Q2 and Q5, and the combination of the transistors Q3 and Q6 are in bridge connection in three phases between the positive electrode and the negative electrode of the battery pack (DC power source) 8. The collectors or emitters of the transistors Q1 to Q6 are connected to the stator coils 2d (U, V, W) of the motor 2 which are in star connection.

The gates of the transistors Q1 to Q6 are connected to the control circuit part 4. The control circuit part 4 outputs corresponding PWM signals H1 to H6 to the gates of the six transistors Q1 to Q6. Switching operations of the six transistors Q1 to Q6 are carried out by the PWM signals H1 to H6. The DC voltage of the battery pack 8 applied to the inverter circuit part 3 is converted to drive voltages Vu, Vv, and Vw of three phases (U phase, V phase, and W phase) by the switching operations. The drive voltages Vu, Vv, and Vw of the three phases (U phase, V phase, and W phase) are applied to the stator coils 2d (U, V, W) of the motor 2, respectively.

The control circuit part 4 drives the inverter circuit part 3. The control circuit part 4 has a rotator position detecting part 16, a rotation number detecting circuit 17, a temperature increase measuring circuit 19, a current detecting circuit 18, the applied voltage setting circuit 14, a rotation direction setting circuit 15, a computing part 20, and a control signal outputting circuit 13.

The rotator position detecting circuit 16 detects the rotation position of the rotor 2a with respect to the stator coils 2d (U, V, W) of the stator 2c based on output signals of the rotation position detecting elements 10, 11, and 12. The detected rotation position of the rotor 2a is output to the computing part 20.

The rotation number detecting circuit 17 detects the number of rotations of the motor 2 based on the time intervals of the signals output from the rotation position detecting elements 10, 11, and 12. The detected number of rotations of the motor 2 is output to the computing part 20.

The temperature increase measuring circuit 19 measures the temperature of the motor 2 or the switching elements 3a by using a thermistor (heat sensitive element) 19a provided in the vicinity of the motor 2 and the semiconductor switching elements 3a of the inverter circuit part 3. The measured signal is output to the computing part 20.

The current detecting circuit 18 always detects the drive current of the motor 2. The detected current value is output to the computing part 20.

The applied voltage setting circuit 14 sets the duty rate of the pulse width of the PWM signal (hereinafter, referred to as "PWM duty") corresponding to a control signal output from the switch trigger 7 in accordance with the trigger pressed distance by the trigger operating part 7a of the switch trigger 7.

The rotation direction setting circuit 15 detects whether the rotation direction of the motor 2 (rotor 2a) set by a forward/reverse switching lever 9 (see FIG. 1) is a forward direction or a reverse direction and sets the rotation direction of the motor 2 (rotor 2a) based on the detection result. The rotation direction setting circuit 15 outputs a rotation direction setting signal including the information of the set rotation direction to the computing part 20.

Based on the PWM duty set by the applied voltage setting circuit 14, the computing part 20 generates drive signals, i.e., PWM signals for the switching elements Q1 to Q6 of the inverter circuit part 3 and outputs the signals, thereby controlling the voltages Vu, Vv, and Vw applied to the motor 2.

Meanwhile, the computing part 20 switches the predetermined switching elements Q1 to Q6 in a predetermined order based on the information output from the rotation direction setting circuit 15 and the rotator position detecting circuit 16. Consequently, the applied voltages Vu, Vv, and Vw are supplied to the stator coils 2d (U, V, W) in a predetermined order, and, as a result, the motor 2 rotates in the set rotation direction.

The computing part 20 is a microcomputer and has ROM, CPU, RAM, various types of timers, etc. (all of them are not shown). The ROM stores processing programs, which execute later-described control flows, and control data. The CPU executes such a processing program and generates above described drive signals. The RAM stores data temporarily. The timers count time.

The computing part 20 uses the drive signals input to the gates of the semiconductor switching elements Q4, Q5, and Q6 of the negative power source side as pulse width modulation signals (PWM signals) H4, H5, and H6 among the drive signals (three-phase signals) input to the gates of the six semiconductor switching elements 3a (Q1 to Q6). Then, the computing part 20 varies the PWM duties of the PWM signals based on the output signal of the applied voltage setting circuit 14 corresponding to the trigger pressed distance of the trigger operating part 7a of the switch trigger 7 (see FIG. 1), thereby adjusting the power for the motor 2 and carrying out activation and speed control of the motor 2.

Figure 4:
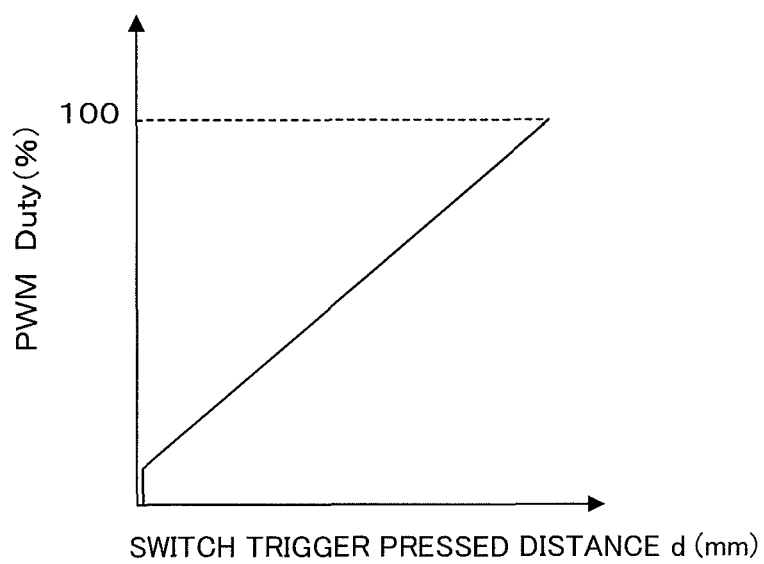
FIG. 4 is a characteristic diagram showing a relation between a pressed distance of a switch trigger and a PWM duty in the driver drill of FIG. 1.

An example of the relation between the trigger pressed distance d of the trigger operating part 7a of the switch trigger 7 and the PWM duty (PWM DUTY) is shown in FIG. 4.

Note that, instead of using the drive signals input to the gates of the semiconductor switching elements Q4, Q5, and Q6 of the negative power source side as the PWM signals, drive signals H1 to H3 input to the gates of the semiconductor switching elements Q1, Q2, and Q3 of the positive power source side may be used as PWM signals. Even in this case, as a result, the DC voltage of the battery pack 8 can be converted to the applied voltages Vu, Vv, and Vw which are supplied to the stator coils 5d (U, V, W).

The control signal outputting circuit 13 converts the drive signals output from the computing part 20 to the control signals (voltage signals) which are actually input to the gates of the switching elements Q1 to Q6 and outputs the signals.

The control circuit part 4 generates the drive signals H1 to H6 by using the above described configuration based on the rotation direction setting signal output from the rotation direction setting circuit 15, the rotation position detection signal output from the rotator position detecting circuit 16, the rotation number detection signal output from the rotation number detecting circuit 17, the motor current detection signal output from the current detecting circuit 18, and the PWM duty setting signal output from the applied voltage setting circuit 14.

The control signals control the switching operations of the semiconductor switching elements Q1 to Q6, and a three-phase AC voltage is applied to the stator coils 2d (U, V, W) of the motor 2.

The motor 2 is activated or stopped by this control of the control circuit part 4. Also, the control circuit part 4 adjusts the PWM duties of part of the drive signals among the drive signals H1 to H6, thereby controlling the motor current and the number of rotations of the motor (rotation speed).

[Lock Detection of Electric Rotating Tool and Control Flow for Overcurrent Protection]

Figure 5:
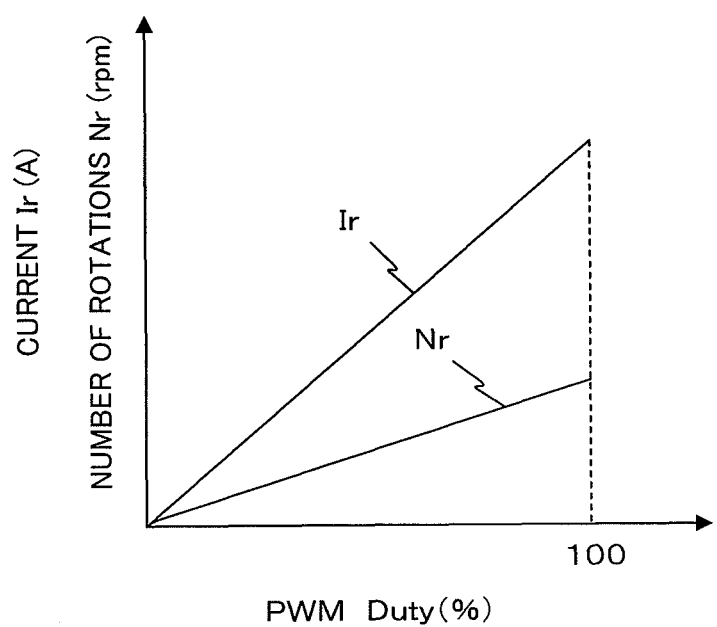
FIG. 5 is a characteristic diagram showing relations between the PWM duty and threshold values in the driver drill of FIG. 2.
Figure 6:
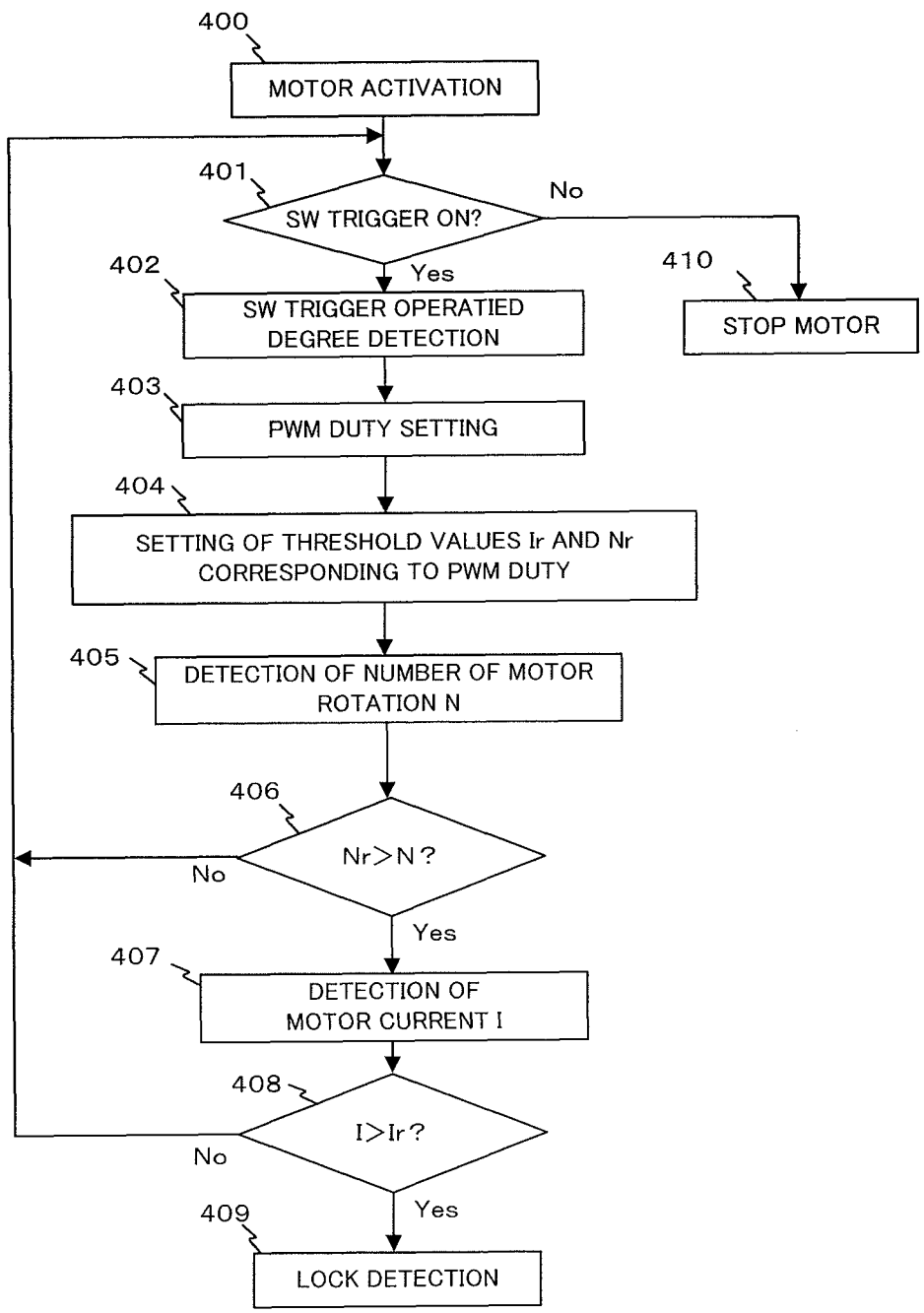
FIG. 6 is a control flow chart according to a first embodiment of a lock detection means in the driver drill of FIG. 2.

FIG. 6 is a control flow chart of the lock detection means of the motor 2, which is realized by the control circuit part 4 of the driver drill 30. The case in which a cutting operation is carried out in the drill mode by using the above described driver drill 30 will be considered. When the motor 2 is caused to be a locked state due to an overload or the like during the cutting operation, a large current equal to or more than a threshold value Ir (the value of the current that flows to the motor 2 when it is in the locked state) serving as a first threshold value flows to the stator coils 2d (U, V, W) of the motor 2. At the same time, the number of rotations of the motor 2 begins to decrease to equal to or lower than a threshold value Nr (the number of the rotations of the motor 2 of the case it is in the locked state) serving as a second threshold value. As shown in FIG. 5, the threshold value Ir and the threshold value Nr are varied depending on the set value of the PWM duty of the PWM signal in the inverter circuit part 3 that drives the motor 2. More specifically, the larger the PWM duty, the higher the current Ir upon locking, and the larger the number of rotations Nr upon locking.

As shown in FIG. 5, the PWM duty (PWM DUTY) and the threshold value Ir and the threshold value Nr are in proportional relations. Therefore, in this control flow, the threshold value Ir and the threshold value Nr for determining the locked state are changed depending on the magnitude of the PWM duty.

In the control flow chart of FIG. 6 for lock detection, first, when the motor 2 is activated (step 400), the computing part 20 determines whether the switch trigger 7 is operated and turned on or not (step 401). When the switch trigger 7 is on (Yes in step 401), the computing part 20 causes the applied voltage setting circuit 14 to detect the trigger operated degree (trigger pressed distance) d of the switch trigger 7 (step 402). Subsequently, the computing part 20 acquires the PWM duty that is set by the applied voltage setting circuit 14 (step 403). Subsequently, the computing part 20 sets the threshold value Ir and the threshold value Nr corresponding to the PWM duty, which is set by the applied voltage setting circuit 14, in a comparator, which is owned by the part per se, based on the relations between the PWM duty and the threshold value Nr and the threshold value Ir as shown in the characteristic diagram shown in FIG. 5 (step 404). Note that the relations between the set PWM duty and the threshold value Nr and the threshold value Ir are not limited to the proportional relations as shown in the characteristic diagram of FIG. 5.

Next, the computing part 20 causes the rotation number detecting circuit 17 to detect the number of rotations N of the motor 2 (step 405). Subsequently, the computing part 20 determines whether the detected number of rotations N is lower than the threshold value Nr, which is set in above described step 404, or not by using the above described comparator (step 406).

When the detected number of rotations N is lower than the threshold value Nr (Yes in step 406), the computing part 20 causes the current detecting circuit 18 to detect a motor current I (step 407). Subsequently, the computing part 20 determines whether the detected motor current I is more than the threshold value Ir, which is set in above described step 404, or not (step 408). Herein, if the detected motor current I is determined to be more than the threshold value Ir (Yes in step 408), it is assumed that the motor 2 is detected to be in the locked state (step 409). In this case, in accordance with needs, a lock detection signal is output from the computing part 20; and, in accordance with the output of the lock detection signal, an indicating lamp such as lighting light (for example, LED) 25 (see FIG. 1), which lights the distal end of the distal-end tool of the driver drill 30, can be lighted to blink. The lighting of the indicating lamp 25 enables an operator to quickly notice that it is in the locked state; therefore, the operator can quickly carry out treatment after, for example, interruption of the operation.

Meanwhile, when the detected number of rotations N is not equal to or less than the threshold value Nr (No in step 406) or when the detected current I has not reached the threshold value Ir (No in step 408), the process returns to step 401, and the computing part 20 enables continued driving of the motor 2. At this point, when the switch trigger 7 is not turned on (No in step 401), the computing part 20 stops the motor 2 (step 410).

Below effects can be obtained by the driver drill 30 having the above lock detection means.

(1) Both the conditions that the motor current (load current) I is larger than the threshold value Ir and that the motor rotation number N is smaller than the threshold value Nr have to be satisfied as the detection conditions of the locked state; therefore, the locked state can be appropriately and accurately detected.

If merely the motor current is used as the detection condition of the locked state, when the threshold value Ir is set to be comparatively low in the case in which comparatively large rotation torque is needed, the state in which merely the output power is deficient may be erroneously detected as the locked state during normal drive. In the present embodiment, the condition that the number of rotations of the motor 2 is smaller than the threshold value also serves as the detection condition of the locked state; therefore, such erroneous detection can be prevented.

Figure 7:
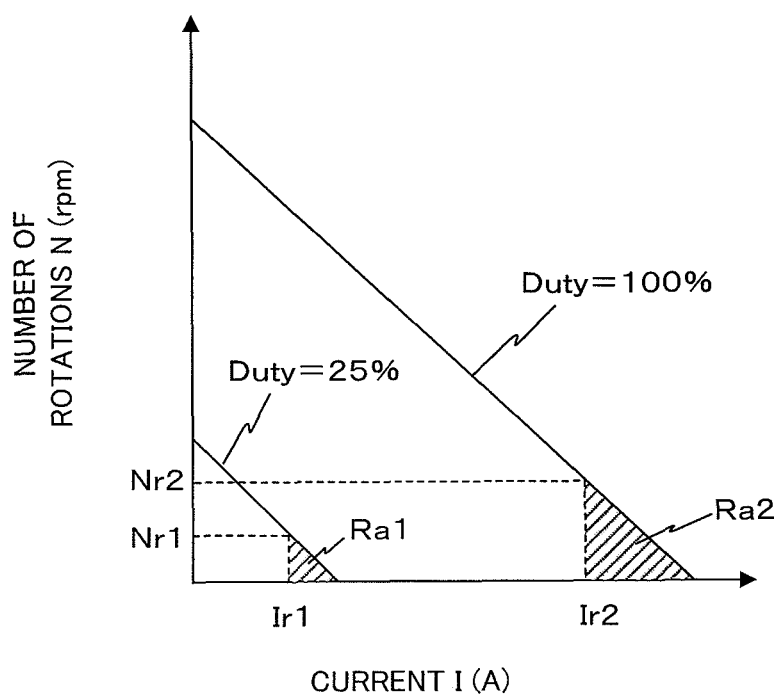
FIG. 7 is a characteristic diagram for explaining lock allowable ranges of the cases in which the PWM duty in the driver drill of FIG. 2 is varied.

(2) The threshold values Ir and Nr are changed in accordance with the magnitude of the PWM duty of the motor drive signal; therefore, even in an operation in which the PWM duty is small and the rotation torque is small, the locked state of the motor 2 upon overloading can be appropriately detected. For example, as shown in FIG. 7, when the PWM duty is 25%, the threshold value of the number of rotations is set to Nr1, and the threshold value of the current is set to Ir1. On the other hand, when the PWM duty is 100%, the threshold value of the number of rotations is set to Nr2 (Nr2>Nr1), and the threshold value of the current is set to Ir2 (Ir2>Ir1). As a result, even in the operation in which the PWM duty is 25% and the rotation torque is comparatively small, the locked state (state of a lock allowable range Ra1) can be accurately detected.

On the other hand, in the operation in which the PWM duty is 100% and the rotation torque is large, the threshold value Nr2 and the threshold value Ir2 are separately set; therefore, the locked state (state of a lock allowable range Ra2) can be appropriately detected even when the PWM duty is 100%. Oppositely, with respect to the drive of the case in which the PWM duty is 25%, the control that causes an overload state is prohibited.

(3) Thermal damages of the motor 2 and the inverter circuit part 3 can be prevented by quickly detecting the locked state. In addition, since efficient lock detection can be carried out, the operating efficiency per one time of charge of the battery pack 8 can be improved.

Second Embodiment

Next, a second embodiment of the present invention will be explained.

Figure 8:
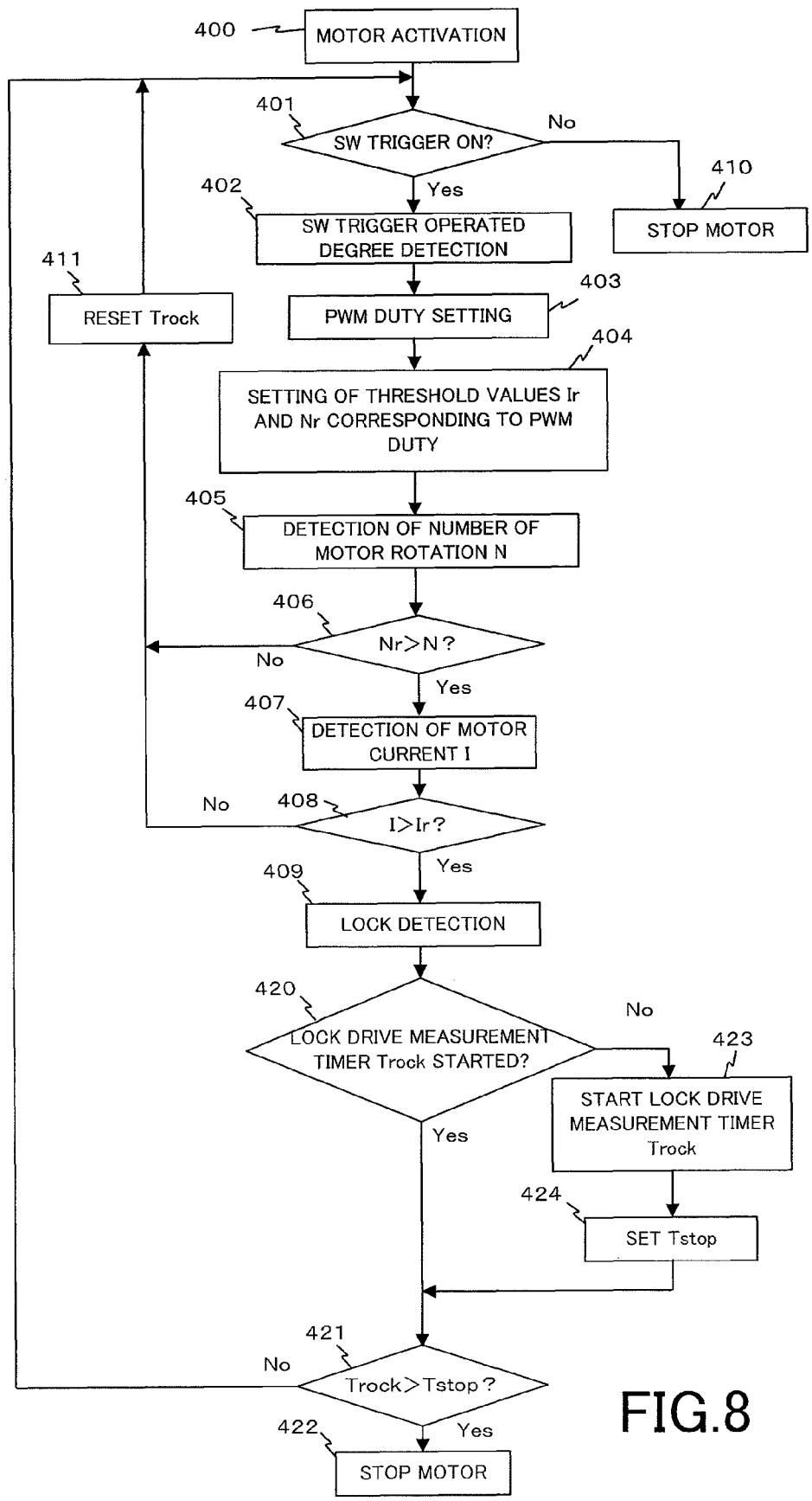
FIG. 8 is a control flow chart according to a second embodiment of a lock detection means and a motor stopping means in the driver drill of FIG. 2.

FIG. 8 is a control flow chart in which the control circuit part 4 of the driver drill detects the locked state of the motor 2 in order to protect the motor 2 from an overcurrent. Note that, in the determination or processing steps (steps) of the control flow chart shown in FIG. 8, the steps same as the determination or processing steps of the control flow chart according to the above described first embodiment shown in FIG. 6 are denoted by the same reference numerals, and detailed explanations of the steps are omitted.

The computing part 20 of the control circuit part 4 according to the present embodiment detects, as the lock detection means, that the motor 2 has become the locked state and then further functions as a motor stopping means, which stops drive of the motor 2.

As shown in FIG. 8, the lock detection flow chart from the activation process (step 400) of the motor 2 to the lock detection process (step 409) is same as that of the above described first embodiment. In the present embodiment, when it is detected that the motor 2 has become the locked state (Yes in step 409) wherein the rotation number of the motor 2 is lower than the threshold value Nr and the current Ir of the motor 2 is higher than the threshold value, the motor stopping means (computing part 20) causes the motor 2 to drive in the locked state for allowable time, during which the locked state does not cause burnout of the motor 2 or cause damage such as current destruction thereto, and then stops driving the motor 2. This motor stopping means is realized by the below control flow.

After the locked state of the motor 2 is detected in step 409, the computing part 20 determines whether a lock drive measurement timer (not shown) has been already started or not (step 420). Merely when it has not been started yet (No in step 420), the computing part 20 starts the lock drive measurement timer (step 423) and sets motor stop time (lock allowable time) Tstop in accordance with the magnitude of the motor current (step 424). The time in the locked state (lock drive time) Trock is counted by the lock drive measurement timer.

Next, the computing part 20 determines whether the lock drive time Trock, which is counted up by the lock drive measurement timer, has exceeded predetermined time (lock allowable time) Tstop or not (step 421). When the lock drive time Trock exceeds the lock allowable time Tstop (Yes in step 421), the computing part 20 stops the motor 2 (step 422). As a result, the motor 2 is protected from an overcurrent, and burnout is prevented.

Herein, the lock allowable time Tstop is determined to be the allowable time that does not cause burnout in the motor 2 and the inverter circuit part 3. According to the present embodiment, in consideration of temperature increase according to the threshold value Ir of the motor current (switching current) that flows to the stator coils 2d of the motor 2 and the inverter circuit part 3, the lock allowable time Tstop is experimentally determined as the time for which power can be distributed up to a restrictive temperature Ttr (hereinafter, referred to as a "burnout temperature Ttr") that does not cause burnout in the motor 2 or the inverter circuit part 3. In other words, in the present embodiment, the lock allowable time Tstop corresponding to the threshold value Ir is experimentally obtained and stored in a memory of the computing part 20.

Figure 9:
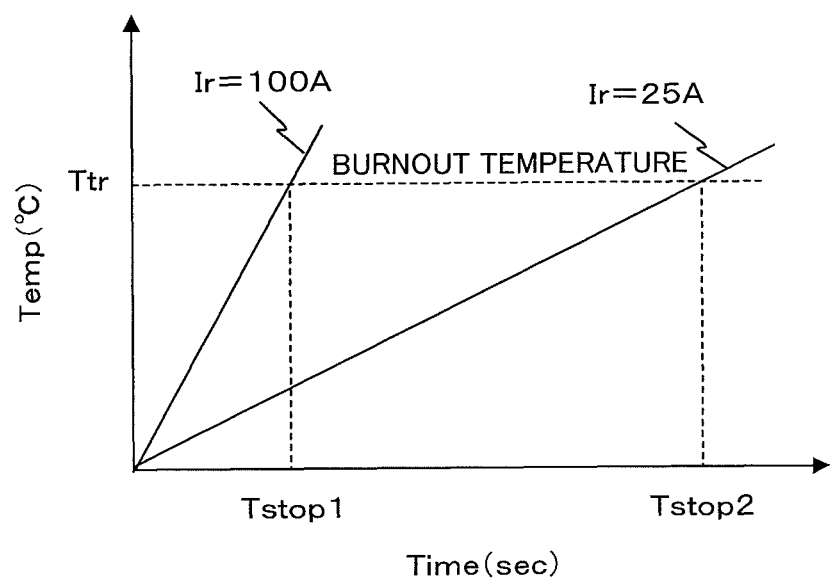
FIG. 9 is a characteristic diagram showing lock allowable time in the driver drill of FIG. 2.

FIG. 9 is a characteristic diagram showing relations between a rise temperature Temp of the motor 2 and rise time Time in the locked state. FIG. 9 shows the characteristics indicating the relations between the rise time Time and the rise temperature Temp for respective threshold values Ir. The burnout temperature Ttr is the limit temperature which can be allowed as a power-distributable range. In this case, the lock allowable time Tstop of the case in which the threshold value Ir is 100 A is Tstop 1, and the lock allowable time Tstop of the case in which the threshold value Ir is 25 A is Tstop 2. Tstop 1 is shorter than Tstop 2.

Figure 10:
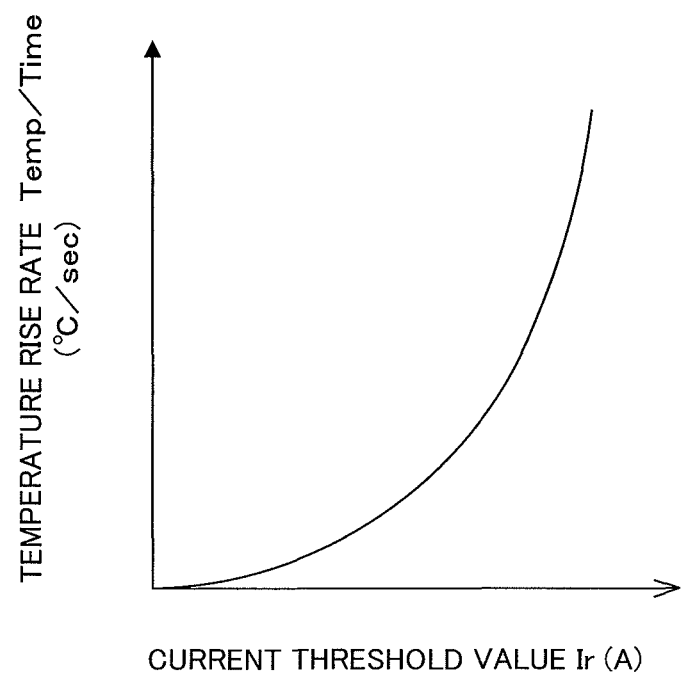
FIG. 10 is a characteristic diagram showing a relation between a current threshold value and a temperature rise rate in the driver drill of FIG. 2.

As shown in FIG. 10, the larger the motor current, the more the temperature rise rate (Temp/Time) per unit time with respect to the threshold value Ir is increased in an exponential manner.

Figure 11:
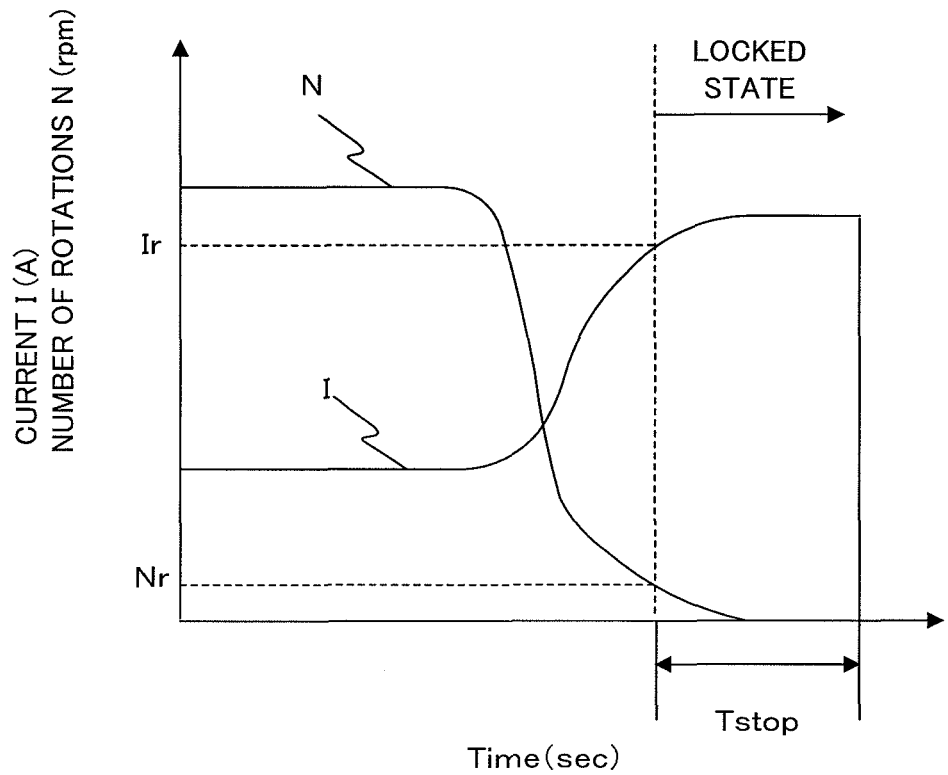
FIG. 11 is a characteristic diagram showing temporal variation of a current and the number of times of rotations in the driver drill of FIG. 2 and lock drive time.

FIG. 11 is a characteristic diagram showing variation of the motor current I and the motor rotation number N in the lock allowable time Tstop after the locked state is caused. In the locked state in which the current is exceeding the threshold value Ir, the motor current I is saturated at a certain value. In this saturated state, the temperature of the motor 2 reaches the burnout temperature Ttr as shown in FIG. 9.

According to the driver drill 30 having the above lock detection means and motor stopping means, the effects similar to those of the above described first embodiment can be obtained.

Furthermore, from the locked state is started until the lock allowable time Tstop elapses, drive is carried out within the lock allowable range Ra, in which burnout is not caused, (see FIG. 7), and the locked state can be cancelled in some cases; therefore, accurate lock detection and overcurrent protection, which are not affected by switching noise caused by the semiconductor switching elements 3a and noise (spike voltage) of the motor 2 can be realized. In addition, the drive can be continued within the range in which the motor 2 is not burnt out without unnecessarily stopping the motor during a drilling operation, etc.; therefore, operating efficiency can be improved. Therefore, the operating efficiency per one time of charge of the battery pack 8 can be also improved.

Third Embodiment

Next, a third embodiment of the present invention will be explained.

Figure 12:
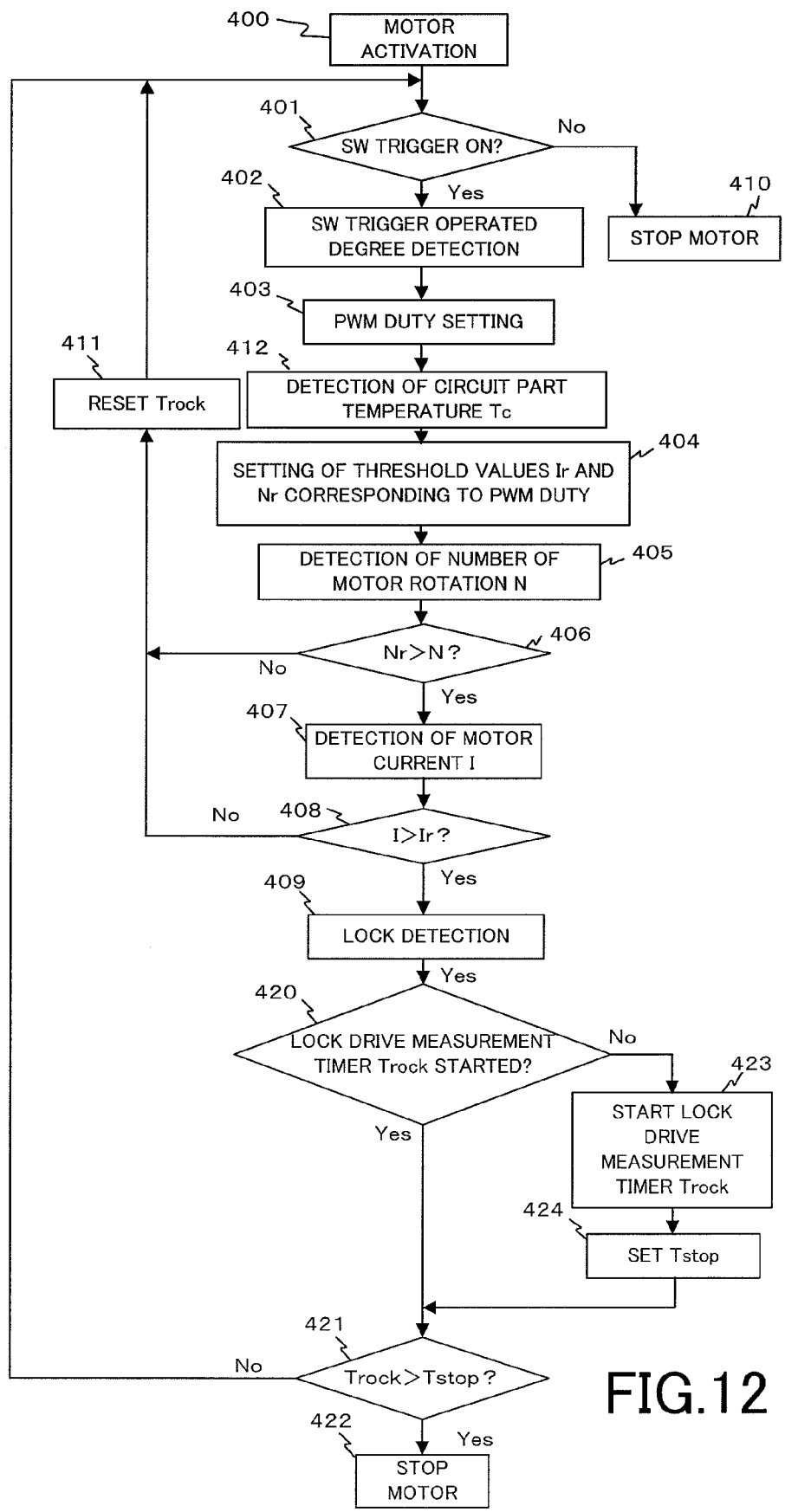
FIG. 12 is a control flow chart according to a third embodiment of a lock detection means and a motor stopping means in the driver drill of FIG. 2.

FIG. 12 shows a control flow executed by the control circuit part 4 of the driver drill 30 according to the present embodiment. In the present embodiment, the control circuit part 4 detects the locked state of the motor 2 and protects the motor 2 of the locked state from an overcurrent. Note that, in determination or processing steps of the control flow according to the present embodiment shown in FIG. 12, the steps same as the determination or processing steps of the control flows according to the above described first and second embodiments are denoted by the same reference numerals, and detailed explanations of the steps are omitted.

In the above described second embodiment, in step 424, the lock allowable time Tstop is uniquely determined based on the magnitude of the motor current, i.e., the magnitude of the threshold value Ir only. However, in the present embodiment, the ambient temperature of the motor 2 or the inverter circuit part 3 is taken into consideration to determine the lock allowable time Tstop.

More specifically, in the present embodiment, the ambient temperature Temp of the motor 2 and the inverter circuit part 3 immediately before the locked state begins is detected by the heat sensitive element 19a and the temperature increase measurement circuit 19 of the control circuit part 4 (see FIG. 3). Then, based on the detected ambient temperature Temp and the threshold value Ir, the lock allowable time Tstop is determined by the computing part 20. Thus, accurate and appropriate lock allowable time Tstop can be set.

Figure 13:
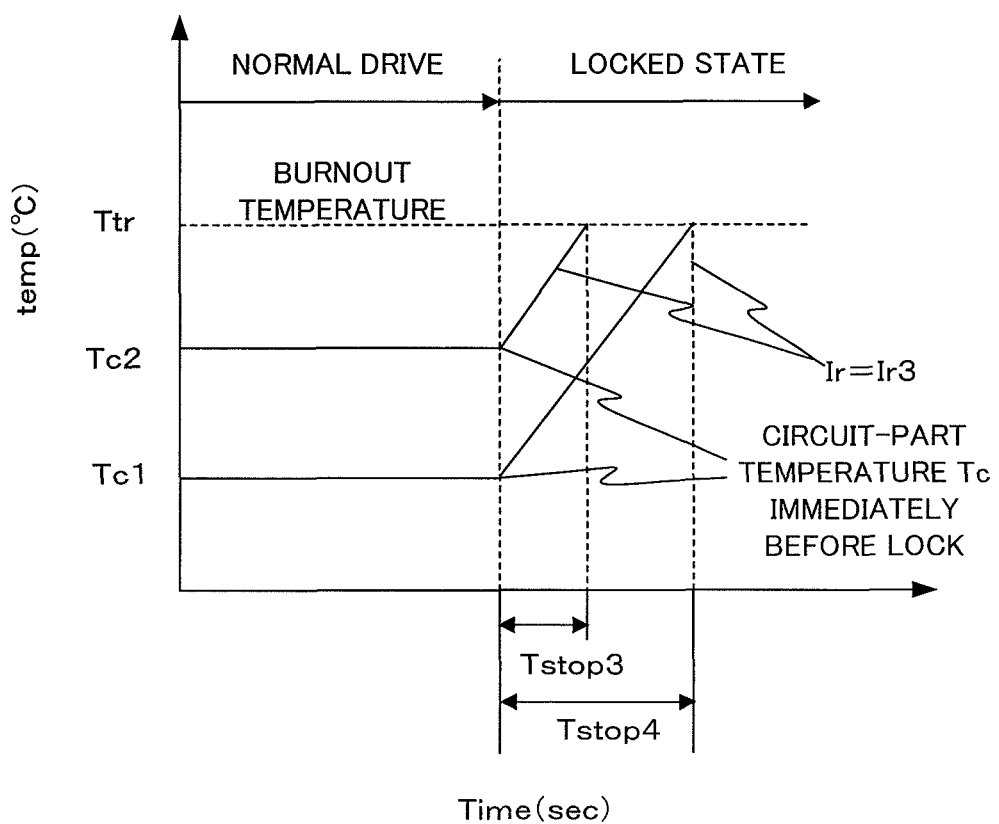
FIG. 13 is a characteristic diagram (No. 1) showing temporal variations of a motor temperature before and after the locked state is caused in the driver drill of FIG. 2.

FIG. 13 shows a characteristic diagram showing temporal variations of the temperature of the motor 2 before and after occurrence of the locked state. FIG. 13 shows a temperature variation of the case in which the ambient temperature of the motor 2 immediately before the locked state (circuit-part temperature immediately before lock) Tc is Tc1 and a temperature variation of the case in which it is Tc2 (Tc1<Tc2). In both of the characteristics, the threshold value Ir is set to Ir3, which is the same.

When the circuit-part temperature Tc immediately before lock is low, in other words, when the ambient temperature Tc is Tc1 (Tc1<Tc2), the lock allowable time Tstop becomes longer than the case of Tc2 and is Tstop4 (Tstop4>Tstop3). In this manner, the allowable range of the locked state until the temperature is increased to the burnout temperature Ttr can be expanded to an appropriate range in accordance with the ambient temperature T; therefore, wasteful stop of the motor 2 can be more readily eliminated.

In this case, the lock allowable time Tstop is calculated (estimated) based on the ambient temperature Tc of the motor 2 and the inverter circuit part 3 immediately before the locked state begins, the threshold value Ir at which the locked state begins, and the burnout temperature Ttr.

When a large current flows momentarily like upon lock of the motor 2, the temperatures of the motor 2 and the inverter circuit part 3 rapidly increase; however, the heat sensitive element 19a such as a thermistor cannot follow the rapid temperature increase since it has a thermal resistance, etc. Therefore, the temperature increase of the motor 2 and the inverter circuit part 3 upon lock cannot be accurately measured merely by the temperature increase measurement circuit 19.

Therefore, when the lock allowable time Tstop that is estimated based on the temperature increase upon lock is used in the above described manner, the motor 2 and the inverter circuit part 3 can be more practically and reliably protected.

Note that, the lower the ambient temperature Tc, the longer the lock allowable time Tstop that can be set; this is for the reason that the temperature difference between the heat generation temperature of the motor 2 and the ambient temperature Tc becomes large, heat dissipation effects are improved, and the time that is taken until it reaches the burnout temperature Ttr is extended.

Figure 14:
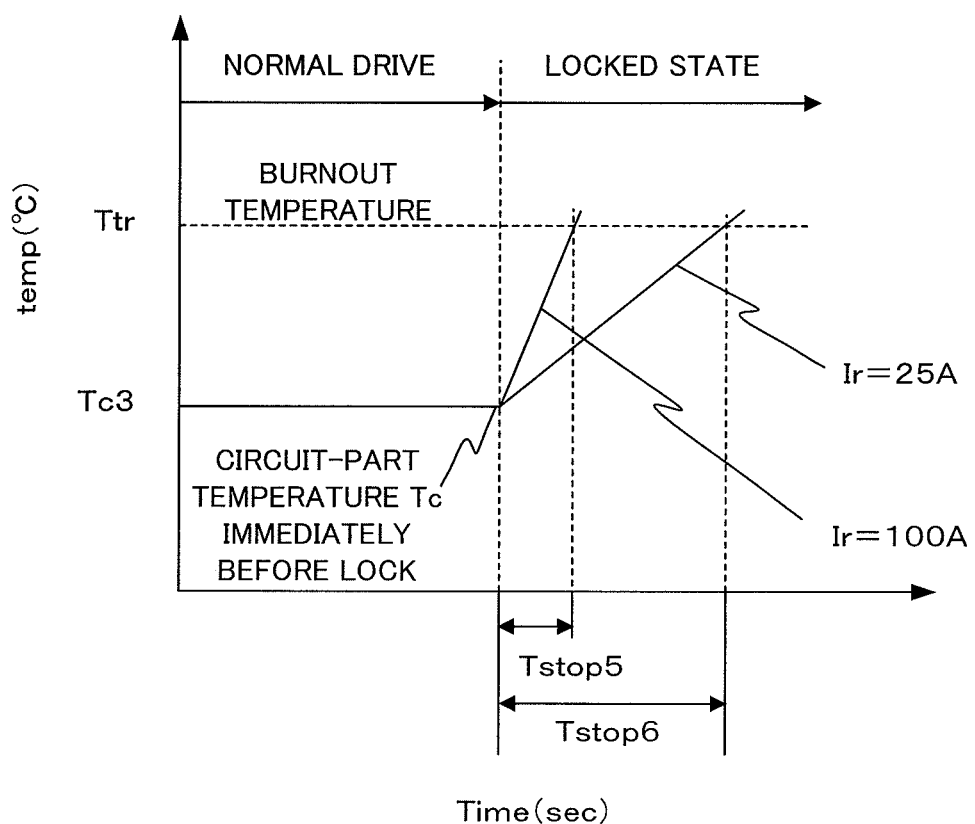
FIG. 14 is a characteristic diagram (No. 2) showing temporal variations of the motor temperature before and after the locked state is caused in the driver drill of FIG. 2.

As shown in a characteristic diagram of FIG. 14, the dependency of the lock allowable time Tstop on the ambient temperature Tc is different depending on the magnitude of the motor current I. The larger the motor current I, the shorter the lock allowable time Tstop. This is for the reason that, the larger the motor current I, the larger the heating value of the motor 2.

According to the driver drill 30 having the above lock detection means and the motor stopping means, similar effects as the above described cases of the first and second embodiments can be obtained. According to the present embodiment, the lock allowable time Tstop of the locked state, which is from the point when the locked state begins and until the point immediately before the motor 2 is burnt out, can be effectively utilized; therefore, the operating efficiency can be further improved.

Fourth Embodiment

Next, a fourth embodiment of the present invention will be explained.

Figure 15:
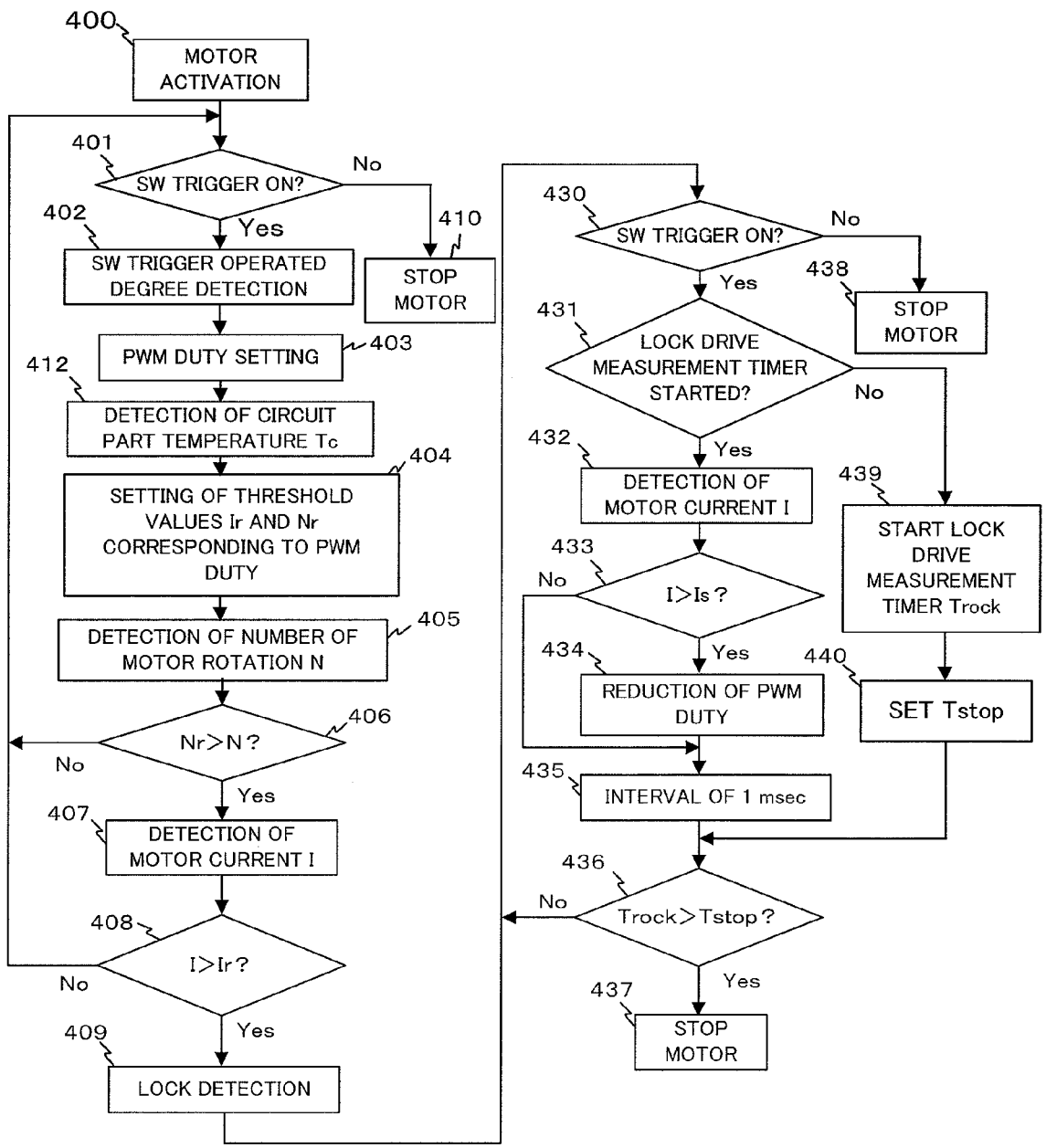
FIG. 15 is a control flow chart according to a fourth embodiment of the lock detection means and the motor stopping means in the driver drill of FIG. 2.

FIG. 15 shows a control flow executed by the control circuit part 4 of the driver drill 30 according to the present embodiment. Also in the present embodiment, the control circuit part 4 detects the locked state of the motor 2 and protects the motor 2, which is in the locked state, from an overcurrent. Note that, in the determination or processing steps of the control flow according to the present embodiment shown in FIG. 15, the steps same as the determination or processing steps of the control flows according to the above described first to fourth embodiments are denoted by the same reference numerals, and detailed explanations of the steps are omitted.

As shown in FIG. 15, in the present embodiment, the control flow for lock detection of step 400 to step 409 is same as that of the above described third embodiment shown in FIG. 12; therefore, detailed explanations thereof are omitted. But in the present embodiment, step 411 is not executed.

After the locked state is detected (step 409), the computing part 20 checks again whether the switch trigger 7 is on or not (step 430). When it is determined that the switch trigger 7 is on (Yes in step 430), the computing part 20 determines whether the lock drive measurement timer is started or not (step 431) as well as the above described second embodiment. When the timer is not started (No in step 431), the computing part 20 starts counting the time (lock drive measurement timer) Trock of the locked state (step 439), and the lock allowable time (motor stop time) Tstop of the motor 2 is set in accordance with the magnitude of the threshold value Ir of the motor current (step 440).

Next, the computing part 20 carries out comparison between the lock drive time Trock and the lock allowable time Tstop (step 436). When the lock drive time Trock is shorter than the lock allowable time Tstop (No in step 436), the computing part 20 returns to step 430 and determines whether the switch trigger 7 is on or not.

When it is determined that the switch trigger 7 is on (Yes in step 430), the computing part 20 determines again whether the lock drive measurement timer is started or not (step 431). Since the lock drive measurement timer has already been started, this determination is affirmed (Yes in step 431), and the process proceeds to step 432. Subsequently, the computing part 20 detects the motor current I by the current detection circuit 18 (step 432). Subsequently, the computing part 20 compares the detected motor current I with a current limit value Is (step 433).

Figure 16A:
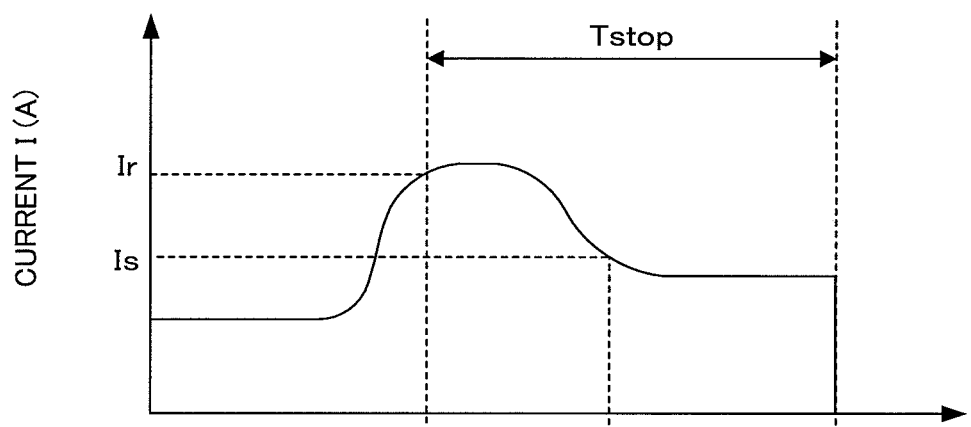
FIG. 16A is a diagram showing a temporal variation of a motor current in the driver drill of FIG. 2.

As shown in a characteristic diagram of FIG. 16A, the current limit value Is is a current value that is determined in accordance with the magnitude of the threshold value Ir, which is set in step 408. The current limit value Is is set to be a value smaller than the threshold value Ir, i.e., Is<Ir in consideration of the relation between the threshold value Ir and the burnout temperature Ttr.

By setting the current limit value Is to have the relation of Is<Ir, when the motor 2 is in the locked state, the temperature increase up to the burnout temperature Ttr can be extended to longer time as much as possible.

In other words, the lock allowable time Tstop during which the motor 2 can be maintained in the drive state in the locked state can be further extended by the setting of the current limit value Is. Note that, the relation of Is<Ir has to be stored in the memory of the computing part 20 in advance.

Figure 16B:
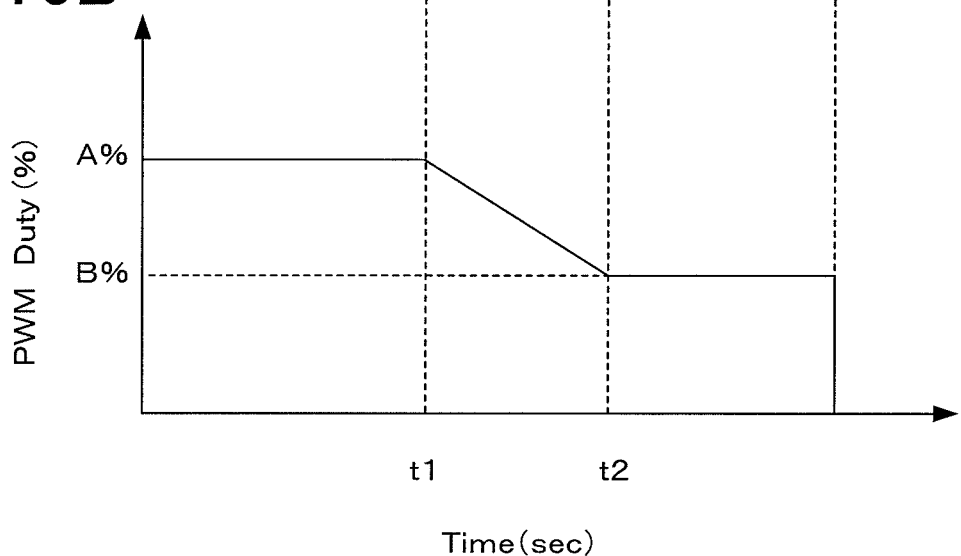
FIG. 16B is a characteristic diagram showing a temporal variation of the PWM duty.

When the motor current I is larger than the current limit value Is (Yes in step 433), the computing part 20 carries out control so that the PWM duty of the drive signal of the motor is gradually reduced from A (%) to B (%) as shown in FIG. 16B in order to set the motor current I to Is (step 434). After the PWM duty is reduced, the computing part 20 has a period (interval) of 1 msec (step 435) and subsequently determines whether the lock drive time Trock has exceeded the predetermined time (lock allowable time) Tstop or not by the lock drive measurement timer of the computing part 20 (step 436). If the lock drive time Trock elapses the lock allowable time Tstop (Yes in step 436), the computing part 20 stops the motor 2 (step 437). As a result, the motor 2 is protected from an overcurrent, and burnout is prevented.

On the other hand, when the switch trigger 7 is not turned on (No in step 430), the computing part 20 stops the motor 2 (step 438).

According to the driver drill 30 having the above lock detection means and the motor stopping means, effects similar to those of the above described cases of the first to third embodiments can be obtained. In addition, according to the present embodiment, the lock allowable time Tstop of the locked state, which is from the point when the locked state begins until the point immediately before the motor is burnt out, can be practically extended; therefore, the operating efficiency can be further improved. The motor current upon lock can be readily adjusted by changing the PWM duty of the drive signal of the motor.

Fifth Embodiment

Next, a fifth embodiment of the present invention will be explained.

FIG. 17 is a control flow chart of the computing part 20 according to the present embodiment. The computing part 20 according to the present embodiment rotates the motor 2 in the direction opposite to the rotation direction at the point when the locked state is detected and executes reverse rotation control for automatically cancelling the locked state.

When the locked state is detected (step 450), the computing part 20 stops driving the motor 2 (step 451). Subsequently, the computing part 20 checks the rotation direction which has been set in the rotation direction setting circuit 15 and sets a reverse-rotation direction with respect to the rotation direction of the motor 2 of the point when it becomes the locked state (step 452).

Next, the computing part 20 determines whether the switch trigger 7 has been turned on or not (step 453). When the switch trigger 7 is determined to be on (Yes in step 453), the computing part 20 rotates the motor 2 in the set reverse-rotation direction and causes a reverse-rotation start timer (not shown) to start counting drive time Tar of the reverse rotation (step 454). Subsequently, the computing part 20 determines whether the reverse-rotation time Tar has exceeded predetermined time Tsr or not (step 455).

The reverse-rotation set time Tsr is the time for imparting the reverse rotation amount, which is required for canceling the engagement of the driver drill 30 and a load in a drilling operation, to the motor 2.

When the reverse-rotation time Tar exceeds the predetermined set time Tsr (Yes in step 455), the computing part 20 stops the reverse rotation of the motor (step 456), checks the rotation direction of the rotation direction setting circuit 15 again, and sets the forward rotation direction as the rotation direction of the motor 2 (step 457). Then, the computing part 20 determines whether the switch trigger 7 is on or not (step 458). If the switch trigger 7 is on (Yes in step 458), the computing part 20 activates the motor 2 in the forward rotation direction (step 459). If the switch trigger 7 is off (No in step 458), the computing part 20 stops the motor 2 (step 461).

When the above described control flow is executed by the computing part 20, the motor 2 is rotated in the reverse-rotation direction with respect to the rotation direction of the point of lock in the case in which the motor 2 is locked by the load; therefore, the lock can be automatically cancelled.

According to the above described embodiments, the locked state of the motor 2 is determined by detecting the magnitudes of the current threshold value (lock detection current) of the electric motor in accordance with the load state of the motor 2 and the rotation-number threshold value (number of rotations of lock detection); therefore, the locked state corresponding to the load state of the motor 2 can be detected. As a result, burnout of the motor 2 can be accurately and appropriately prevented.

In addition, according to the above described embodiments, the detection of the locked state is carried out by setting the threshold value Ir of the current and the threshold value Nr of the number of rotations corresponding to the PWM duty of the PWM signal of the motor 2; therefore, they are suitable for an electric rotating tool using a brushless DC motor as a drive power source.

Furthermore, according to the above described embodiments, the motor 2 is subjected to lock drive for the predetermined time within the range that does not cause burnout after the motor 2 becomes the locked state; therefore, without being affected by switching noise of the semiconductor switching elements of the inverter circuit part 3 and noise (spike voltage) of the motor, accurate and appropriate lock detection and overcurrent protection is achieved, and occurrence of wasteful interruption of operations can be prevented.

Furthermore, according to the above described embodiments, in addition to the above described prevention of occurrence of wasteful interruption of operations, the locked state is detected in accordance with the load state or the PWM duty of the PWM signal; therefore, the efficiency of workload per one time of charge of the battery pack 8 can be improved.

Note that, in the above described embodiments, the case in which the three-phase brushless DC motor is used as the motor 2 has been explained; however, a brushless DC motor other than that of three phases can be used. Also, the present invention can be applied to another electric rotating tool such as a drill, driver, impact driver, disk grinder, other than the driver drill 30 explained in the above described embodiments.

Furthermore, although the lithium ion battery is used as the secondary battery of the battery pack 8 of the electric rotating tool, another secondary battery such as a nickel-cadmium battery, nickel hydride battery can be used. However, when the lithium ion battery is used, the battery pack can be downsized, the weight thereof can be reduced, and improvement of the operating efficiency of the electric rotating tool and improvement of operability by virtue of downsizing and weight-reduction can be expected.

The present invention has been explained above in detail based on the embodiments; however, the present invention is not limited to the above described embodiments, and various modifications can be made within the range that does not depart from the gist of the invention.

This application is based on Japanese Patent Application No. 2008-032944 filed on Feb. 14, 2008. The specification, claims, and drawings of the disclosure thereof are expressly incorporated herein in its entirety.

The invention claimed is:

1. An electric rotating tool comprising:
   an operating part;
   a power source part;
   a motor having a rotor and a stator coil;
   an inverter circuit part which has a semiconductor switching element inserted between the power source part and the stator coil;
   a rotation number detection part configured to detect the rotational rate of the rotor relative to the stator coil and outputs a signal corresponding to a result of the detection; and
   a control part which generates and outputs a pulse-width modulation (PWM) signal for driving the semiconductor switching element of the inverter circuit part, wherein
   the control part includes a computer and the computer generates a first rotational speed threshold value that changes in accordance with a PWM duty of the PWM signal, the duty being varied in accordance with an operated degree of the operating part, the control part being used to control the operation of the electric rotating tool in response to the rotational rate of the rotor detected by the rotation number detection part dropping below the first rotational speed threshold.

2. The electric rotating tool according to claim 1, further comprising a current detection part that detects a drive current flowing through the stator coil and outputs a signal corresponding to a result of the detection, wherein
   the computer determines a second current threshold value, and
   the computer determines a locked state of the motor under conditions that a value of the drive current detected by the current detection part exceeds the second current threshold value and that the rotational rate of the rotor detected by the rotation number detection part is smaller than the first rotational speed threshold value.

3. The electric rotating tool according to claim 2, wherein the computer sets a predetermined time period and the control part generates a control signal to stop the motor when the set time period is elapsed after the locked state of the motor is detected.

4. The electric rotating tool according to claim 3, further comprising a temperature measurement part that measures the temperature of the motor or the inverter circuit part, wherein
   the computer determines the time period based on the temperature measured by the temperature measurement part before the locked state of the motor is detected.

5. The electric rotating tool according to claim 4, wherein the computer determines the time period such that the temperature measured by the temperature measurement part does not reach a burnout temperature after the locked state is detected.

6. The electric rotating tool according to claim 3, wherein the control part generates a control signal to restrict the drive current to a predetermined value, which is smaller than the second current threshold value, within the time period set by the computer.

7. The electric rotating tool according to claim 6, wherein the control part controls the PWM duty of the PWM signal such that the drive current is smaller than the second current threshold value.

8. The electric rotating tool according to claim 2, wherein when the locked state of the motor is detected, the computer controls the motor to rotate in a reverse rotation direction for a predetermined time period, and then stops the motor.

9. The electric rotating tool according to claim 2, wherein when the locked state of the motor is detected, the computer controls the motor to rotate in a reverse rotation direction for a predetermined time period and then rotate in a forward rotation direction again, and controls the motor so that the motor can be activated in the forward rotation direction.

10. The electric rotating tool according to claim 2, further comprising an indicating part that is lit when the computer determines that the motor is in the locked state.

11. The electric rotating tool according to claim 2, wherein the electric rotating tool is a driver drill, a drill, an impact driver, a driver, or a disk grinder.

12. The electric rotating tool according to claim 1, wherein the computer determines the PWM duty of the PWM signal in accordance with the operated degree of the operating part.

13. The electric rotating tool according to claim 1, wherein the power source part is a battery pack, the battery pack comprising a secondary battery.

14. The electric rotating tool according to claim 1, wherein the power source part is a battery pack, the battery pack comprising a lithium ion secondary battery.

15. The electric rotating tool according to claim 1, wherein the motor is a brushless DC motor.

16. A power tool comprising:
   a housing;
   a brushless motor housed in the housing;
   an inverter circuit part that drives the brushless motor;
   a control circuit part that controls the inverter circuit part; and
   a trigger operating part operated by an operator; wherein
   the control circuit part outputs a pulse-width modulation (PWM) signal that has a duty rate corresponding to a pressed distance of the trigger operating part to the inverter circuit part, thereby adjusting power to the brushless motor,
   when the trigger operating part is being operated and the motor is caused to be in a locked state when current I flowing to the brushless motor has exceeded a threshold value Ir, the control circuit part allows current to flow to the brushless motor even in the locked state but only for an allowable time, and
   the allowable time becomes longer as the threshold value Ir becomes smaller.

17. The power tool according to claim 16, wherein when the pressed distance of the trigger operating part is large, the duty rate of the PWM signal becomes larger than when the pressed distance of the trigger operating part is smaller, and when the duty rate is larger, the threshold value Ir becomes larger, thereby shortening the allowable time.

18. The power tool according to claim 16, wherein when the duty rate of the pulse width modulation signal is large, the threshold value Ir becomes larger, thus shortening the allowable time.

19. The power tool according to claim 16, wherein when a temperature Tc of the brushless motor or the inverter circuit part is higher, the allowable time is shorter than when the temperature Tc is low.

* * * * *